US012397567B2

(12) United States Patent
Preliasco et al.

(10) Patent No.: US 12,397,567 B2
(45) Date of Patent: *Aug. 26, 2025

(54) LABEL, PEELING, UNIVERSAL PRINTHEADS AND RELATED METHODS

(71) Applicant: ZEBRA TECHNOLOGIES CORPORATION, Lincolnshire, IL (US)

(72) Inventors: Richard J. Preliasco, North Kingstown, RI (US); Roy P. Lyman, Coventry, RI (US); David F. Beck, Exeter, RI (US); Craig A. Horrocks, North Kingstown, RI (US); Patrick J. Hegarty, Dedham, MA (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/537,589

(22) Filed: Dec. 12, 2023

(65) Prior Publication Data

US 2024/0109345 A1 Apr. 4, 2024

Related U.S. Application Data

(63) Continuation of application No. 17/229,675, filed on Apr. 13, 2021, now Pat. No. 11,840,068, which is a (Continued)

(51) Int. Cl.

*B41J 15/04* (2006.01)
*B41J 2/335* (2006.01)
*B41J 3/36* (2006.01)
*B41J 3/407* (2006.01)
*B41J 17/02* (2006.01)
(Continued)

(52) U.S. Cl.

CPC ............... *B41J 15/04* (2013.01); *B41J 2/335* (2013.01); *B41J 3/36* (2013.01); *B41J 3/4075* (2013.01); *B41J 17/02* (2013.01); *B41J 29/393* (2013.01); *B41J 29/54* (2013.01); *B41J 2/33505* (2013.01);
(Continued)

(58) Field of Classification Search

CPC ... B41J 3/36; B41J 3/4075; B41J 15/04; B41J 15/042; B41J 17/02; B41J 29/02; B41J 29/13; B41J 29/393; B41J 29/54
See application file for complete search history.

(56) References Cited

U.S. PATENT DOCUMENTS 5,427,460 A * 6/1995 Kajiya ................ B65C 11/0289 156/760
5,713,679 A * 2/1998 Taylor ................... B41J 3/4075 400/621
(Continued)

*Primary Examiner* — Jill E Culler

(57) ABSTRACT

An example disclosed printer configured to peel media from a backing, the printer having a peeler assembly that is engageable between a peeling position, wherein the printer is configured to peel the media from the backing, and a non-peeling position, wherein the printer is not configured to peel the media from the backing. The printer further including a sensor configured to send a signal corresponding to a position of the peeler assembly. The printer further including a communication interface configured to receive the position of the peeler assembly from the sensor and configured to transmit the position of the peeler assembly to a secondary component.

20 Claims, 27 Drawing Sheets

Related U.S. Application Data continuation of application No. 15/957,129, filed on Apr. 19, 2018, now Pat. No. 11,001,084, which is a continuation of application No. 15/211,615, filed on Jul. 15, 2016, now Pat. No. 9,975,360, which is a continuation of application No. 13/725,247, filed on Dec. 21, 2012, now Pat. No. 9,434,191, which is a continuation-in-part of application No. 13/085,422, filed on Apr. 12, 2011, now Pat. No. 8,714,851.

(60) Provisional application No. 61/345,987, filed on May 18, 2010, provisional application No. 61/323,264, filed on Apr. 12, 2010.

(51) Int. Cl.

| | |
|---|---|
| ***B41J 29/393*** | (2006.01) |
| ***B41J 29/54*** | (2006.01) |
| *B41J 29/02* | (2006.01) |
| *B41J 29/13* | (2006.01) |

(52) U.S. Cl.
CPC .............. *B41J 15/042* (2013.01); *B41J 29/02* (2013.01); *B41J 29/13* (2013.01)

(56) References Cited

U.S. PATENT DOCUMENTS

| | | | | |
|---|---|---|---|---|
| 6,092,945 | A * | 7/2000 | Takami | B41J 15/042<br>400/613 |
| 6,962,292 | B1 * | 11/2005 | Benton | G06K 17/00<br>235/487 |
| 7,578,332 | B2 * | 8/2009 | Murata | B41J 15/04<br>156/352 |
| 7,695,206 | B2 * | 4/2010 | Kawakami | B41J 3/4075<br>400/663 |
| 9,434,191 | B2 * | 9/2016 | Preliasco | B41J 3/36 |
| 9,975,360 | B2 * | 5/2018 | Preliasco | B41J 3/36 |
| 11,840,068 | B2 * | 12/2023 | Preliasco | B41J 17/02 |

* cited by examiner

LABEL, PEELING, UNIVERSAL PRINTHEADS AND RELATED METHODS

CROSS-REFERENCE TO RELATED APPLICATIONS

This patent arises from a continuation of U.S. patent application Ser. No. 17/229,675, filed on Apr. 13, 2021, which is a continuation of U.S. patent application Ser. No. 15/957,129, filed on Apr. 19, 2018, which is a continuation of U.S. patent application Ser. No. 15/211,615, filed on Jul. 15, 2016, now U.S. Pat. No. 9,975,360, which is a continuation of U.S. patent application Ser. No. 13/725,247, filed on Dec. 21, 2012, now U.S. Pat. No. 9,434,191, which is a continuation-in-part of U.S. patent application Ser. No. 13/085,422 filed on Apr. 12, 2011, now U.S. Pat. No. 8,714,851, which claims the benefit of priority to U.S. Provisional Application No. 61/345,987, filed May 18, 2010, and U.S. Provisional Application No. 61/323,264, filed Apr. 12, 2010, which are all hereby incorporated herein by reference in their entireties.

FIELD

Embodiments discussed herein are related to printers and, more particularly, to systems, methods, apparatuses, computer readable media products and other means for providing printheads and assemblies that are configured to peel media units from backing.

BACKGROUND

Printers are designed and known to be used in traditional office environments. Some printers have a more portable design that allow them to be used for many other applications beyond traditional office printing, such as printing customer receipts at the point of delivery, price tags at product display shelves, shipment labels, parking garage receipts, adhesive labels, law enforcement tickets, and gas and utility inspection documents at people's homes. Through applied effort, ingenuity, and innovation, various printer improvements are embodied by the present invention, examples of which are discussed below.

SUMMARY

Some embodiments discussed herein are related to a printer assembly configured to engage a label and peel the label from a backing without the backing having to be threaded through the printer assembly. The printer assembly may comprise one or more peel bars, support members, actuating shafts, and gears, among other things.

An example embodiment of the present invention may include a printer configured to print to a media disposed on a backing. The printer including a housing including a media cover, a media cover release actuator, and a peeler assembly actuator. The media cover release actuator and the peeler assembly actuator may each be accessible for actuation by a user when the media cover is in a closed position. The media cover release actuator may be configured to release the media cover from the closed position in response to actuation by a user. The peeler assembly actuator may define an engaged position and a disengaged position. The printer may include a peeler assembly at least partially enclosed by the housing and engagable between a peeling position, where the printer is configured to peel the media from the backing, and a non-peeling position, where the printer is not configured to peel the media from the backing. The peeler assembly actuator may be configured to, in response to actuation by the user from the disengaged position to the engaged position, transition the peeler assembly from the non-peeling position to the peeling position. The peeler assembly actuator may be configured to preclude actuation of the media cover release actuator when the peeler assembly actuator is in the engaged position.

Embodiments may further include a lock mechanism configured to lock the peeler assembly actuator in the engaged position. The lock mechanism may include a lock button. The peeler assembly actuator may be permitted to move from the engaged position to the disengaged position in response to the locking button being depressed. The media cover may be released in response to the media cover release actuator being actuated through a range of motion, where the peeler assembly actuator may be configured to block the media cover release actuator from being actuated through the range of motion when the peeler assembly actuator is in the engaged position.

According to some embodiments, the peeler assembly may include a peel bar, a support member connected to the peel bar, and an actuating shaft engaged with the support member. The peeler assembly actuator may be configured to drive the rotation of the actuation shaft in response to the peeler assembly actuator being moved from the disengaged position to the engaged position. The support member may be attached to a printer chassis at a pivot point and the actuation shaft may be configured to pivot the support member about a pivot point in response to being rotated. The media cover may define an open position and the peeler assembly in the peeling position may preclude the media cover from being moved from the open position to the closed position.

An example embodiment of the invention may include a peeler assembly configured to peel print media from a backing, for use in a printer that includes a media cover and a media cover release actuator. The peeler assembly may include a peeler assembly actuator defining an engaged position corresponding to a peel position of the peeler assembly and a disengaged position corresponding to a non-peeling position of the peeler assembly, where the peeler assembly actuator may be configured to preclude actuation of the media cover release actuator when the peeler assembly actuator is in the engaged position. A lock mechanism may be configured to lock the peeler assembly actuator in the first position.

Embodiments of the peeler assembly may include a first support member, a second support member, and a peel bar that extends proximate the first support member and the second support member, substantially perpendicular to the first support member and the second support member. Embodiments may further include an actuating shaft, where the actuating shaft extends between the first support member and the second support member. The peel bar may be disposed between a first end of each of the first support member and the second support member and the actuating shaft may be coupled to the first support member and the second support member proximate a second end of each of the first support member and the second support member. The first support member and the second support member may each be configured to be coupled to a printer chassis at a pivot point between each of their respective first end and second end. In response to rotation of the actuating shaft, each of the first support member and the second support member may be rotated about their respective pivot points. In response to the first and second support members rotating about their respective pivot points, the peel bar may be moved between the peeling position and the non-peeling position.

Embodiments of the present invention may provide a printer that includes a housing, a media cover, a peel bar, a peeler assembly actuator, and a media cover release actuator. The media cover may be configured to be moved between an open position and a closed position. The peeler assembly may be configured to be moved between a peeling position and a non-peeling position. The peeler assembly actuator may be configured to move the peeler assembly between the peeling position and the non-peeling position, where the peeler assembly actuator defines an engaged position corresponding to the peeling position of the peeler assembly and a disengaged position corresponding to the non-peeling position of the peeler assembly. The media cover release actuator may be configured to release the media cover from the closed position in response to the media cover release actuator being actuated, where the media cover release actuator is precluded from being actuated when the peeler assembly actuator is in the first position.

Embodiments may further include a locking mechanism defining a locked position and an unlocked position, where the peeler assembly actuator is precluded from moving from the engaged position to the disengaged position in response to the locking mechanism being in the locked position. The media cover may be precluded from moving between the open position and the closed position in response to the peeler assembly being in the peeling position. The peeler assembly actuator may move between the engaged position and the disengaged position along a first axis, and the media cover release actuator may be configured to be actuated along a second axis, substantially parallel to the first axis.

According to some embodiments, the media cover release actuator and the peeler actuator may each be accessible from outside the housing when the media cover is in the closed position. The peeler assembly actuator may be configured to engage a locking mechanism in response to the peeler assembly actuator being moved from the disengaged position to the engaged position. The peeler assembly actuator may be configured to be movable from the engaged position to the disengaged position in response to the locking mechanism being moved from a locked position to an unlocked position. The locking mechanism may be moved from the locked position to the unlocked position in response to a user actuating a lock button of the locking mechanism.

Embodiments of the present invention may provide a printer including a housing, a media cover configured to be moved between an open position and a closed position, and a peeler assembly configured to move between a peeling position and a non-peeling position. The peeler assembly may be configured to be movable from the non-peeling position to the peeling position when the media cover is in the closed position. The printer may further include a peeler assembly actuator configured to move the peeler assembly between the peeling position and the non-peeling position. The peeler assembly actuator may be configured to, in response to actuation by the user from a disengaged position to an engaged position, transition the peeler assembly from the non-peeling position to the peeling position. The peeler assembly actuator may be configured to be accessible when the media cover is in the closed position.

According to some embodiments, the printer may include a locking mechanism defining a locked position and an unlocked position, where the peeler assembly actuator may be precluded from moving from the engaged position to the disengaged position in response to the locking mechanism being disposed in the locked position. The printer may be configured to print to a continuous strip of media, where the media is threaded around the peel bar in response to the peeler assembly moving from the non-peeling position to the peeling position.

Embodiments of the present invention may provide a printer that includes a peeler assembly that is engagable between a peeling position, where the printer is configured to peel the media from the backing, and a non-peeling position, where the printer is not configured to peel the media from the backing. The printer may further include a sensor configured send a signal corresponding to a position of the peeler assembly, and a printer controller configured to receive the position of the peeler assembly from the sensor and configured to adjust at least one print setting in response to receiving the signal corresponding to the position of the peeler assembly. The at least one print setting may include the print speed, the printhead temperature, or the printhead position. The sensor may include a binary switch operable to detect the peeling position of the peeler assembly or the non-peeling position of the peeler assembly. The sensor may include a proximity sensor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6A:
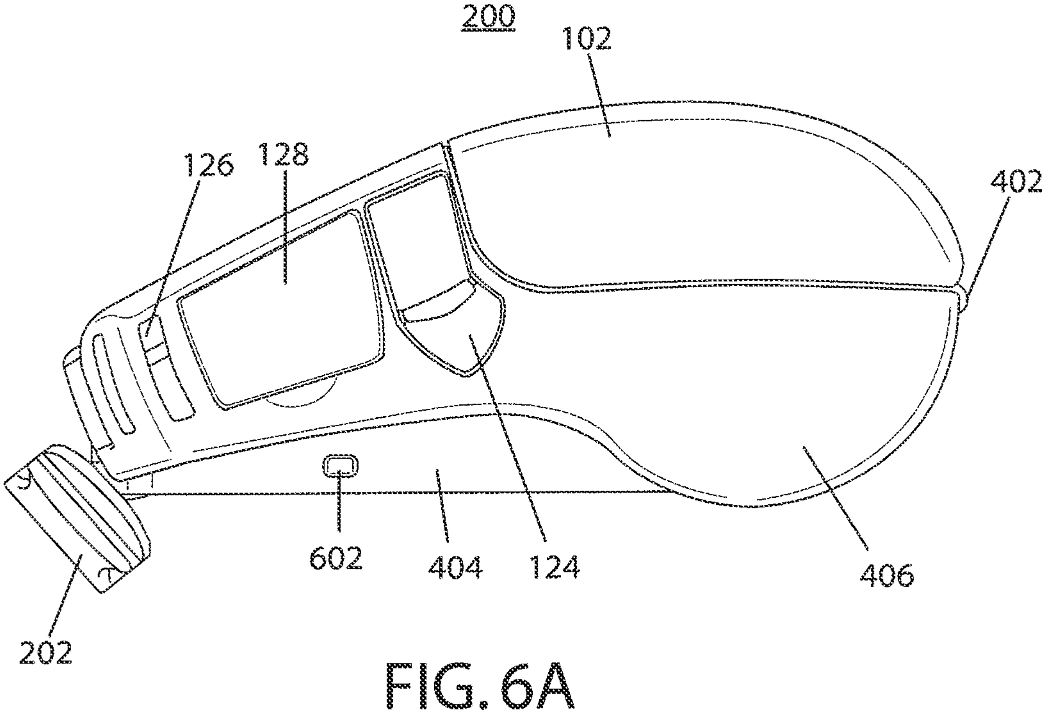
Figure 6B:
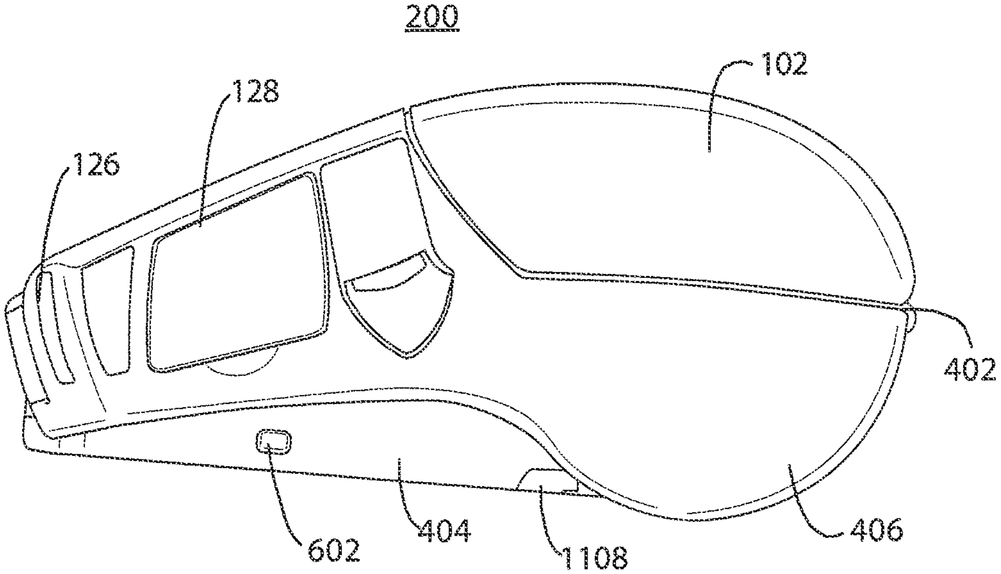
Figure 7:
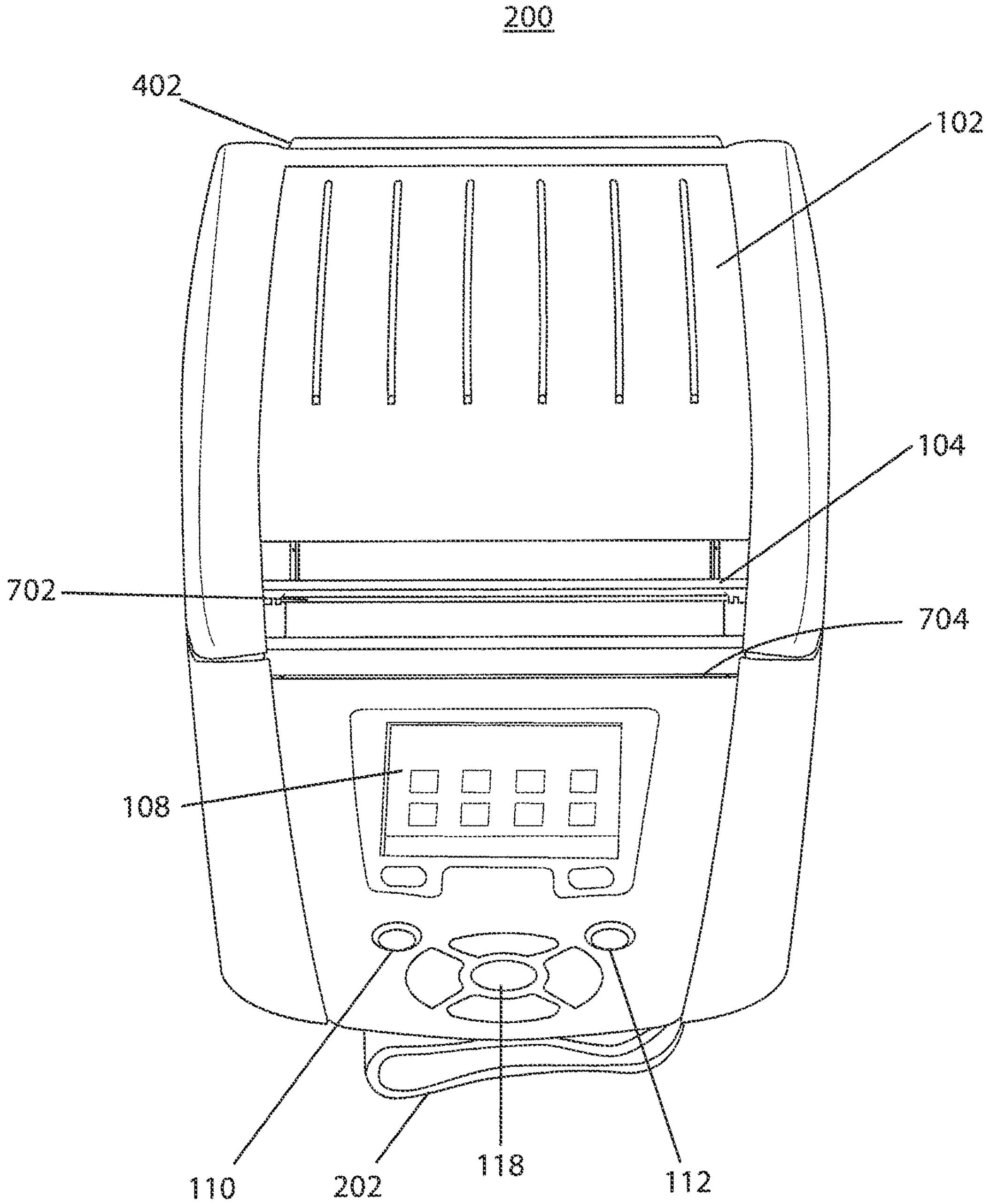
Figure 9A:
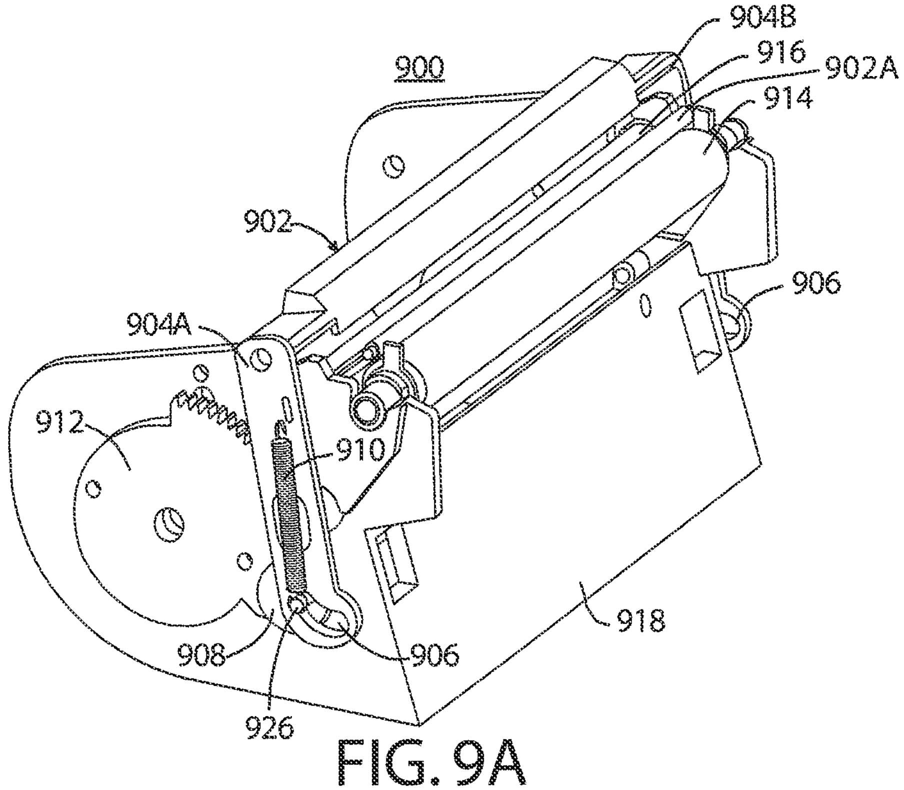
Figure 9B:
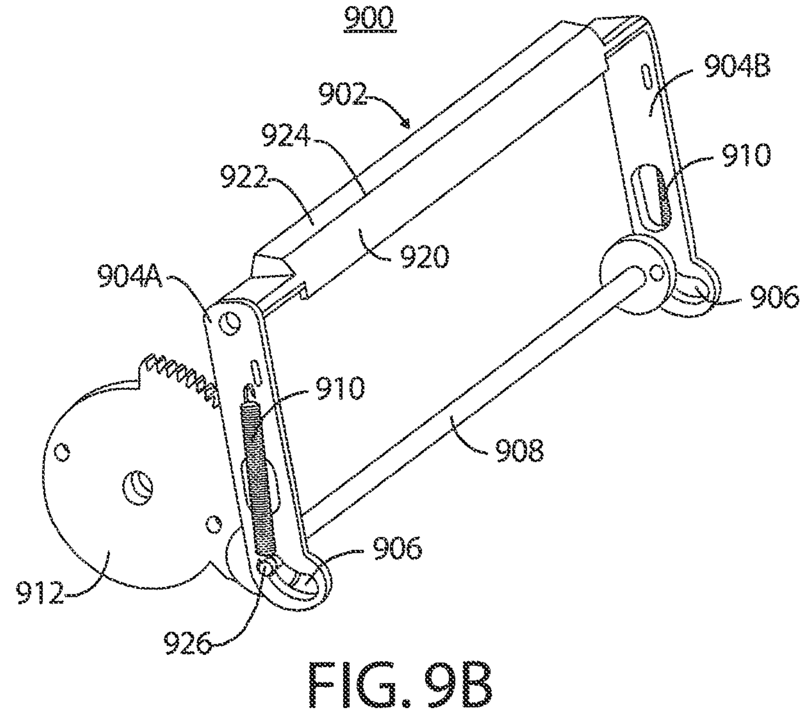
Figure 10B:
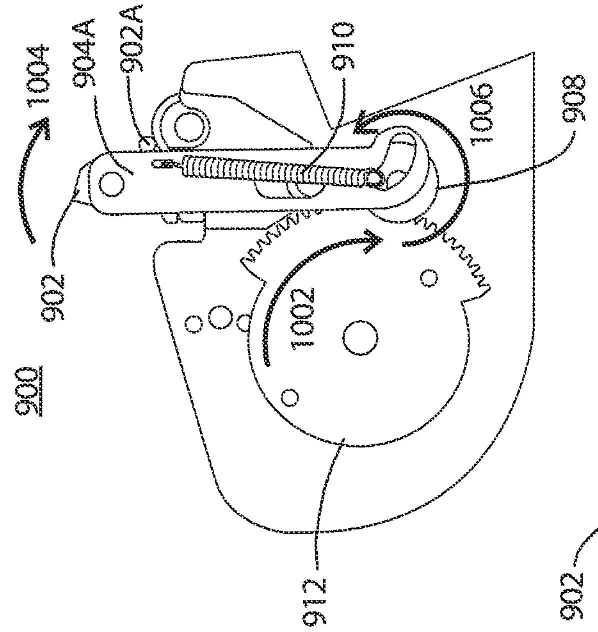
Figure 10A:
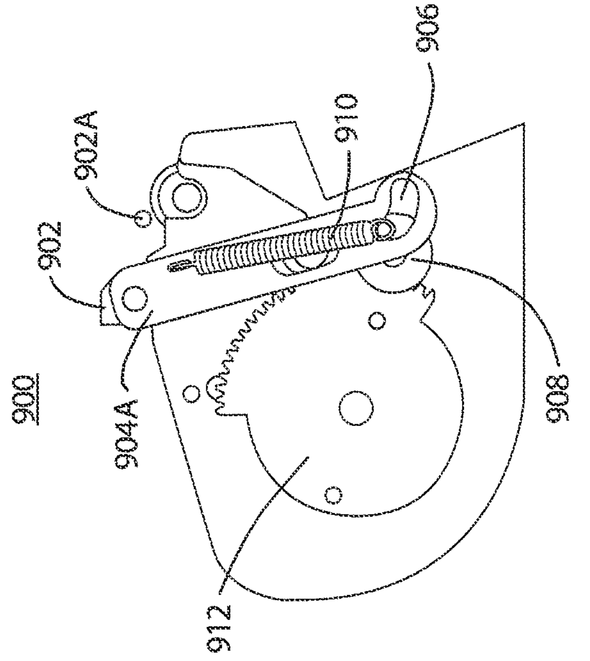
Figure 10C:
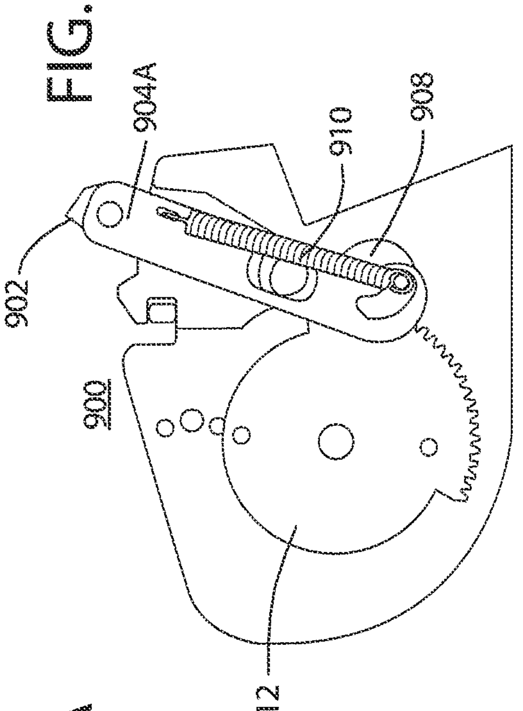
Figure 10D:
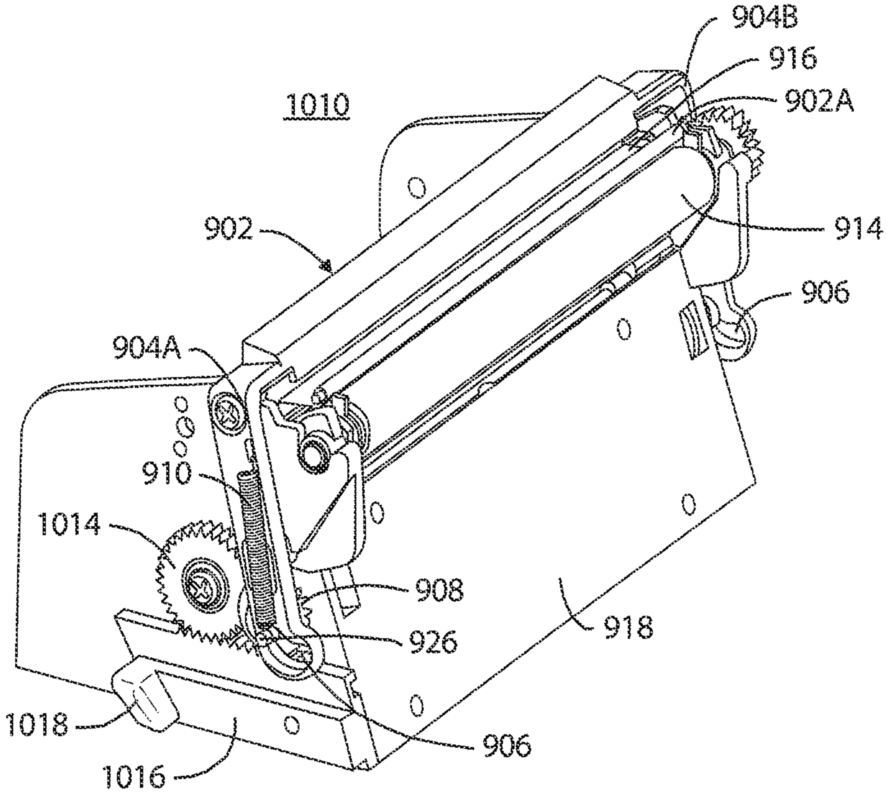
Figure 10E:
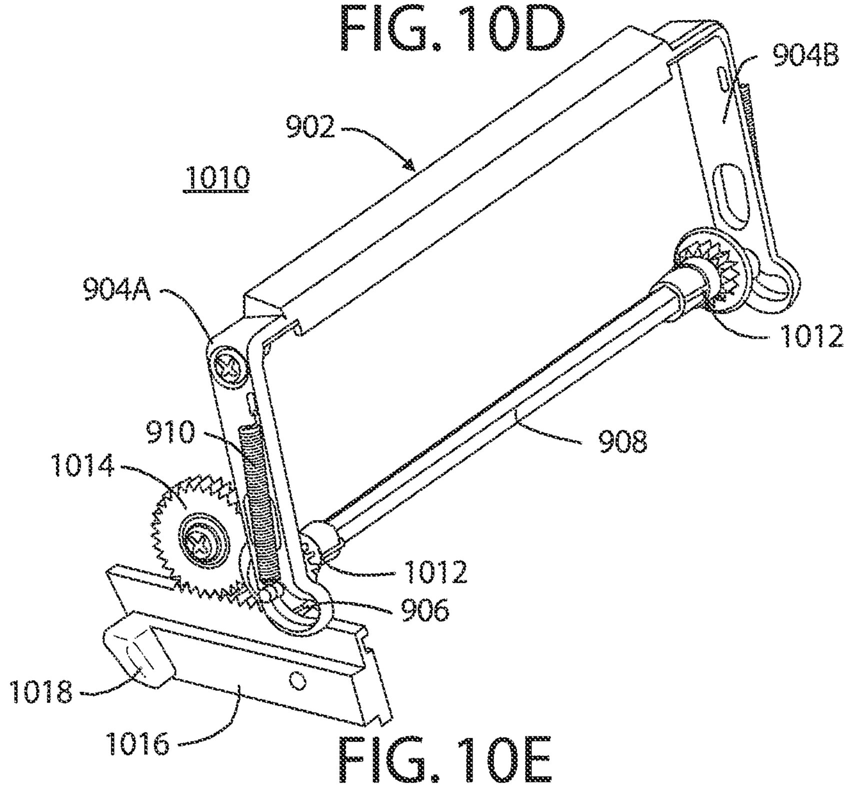
Figure 10F:
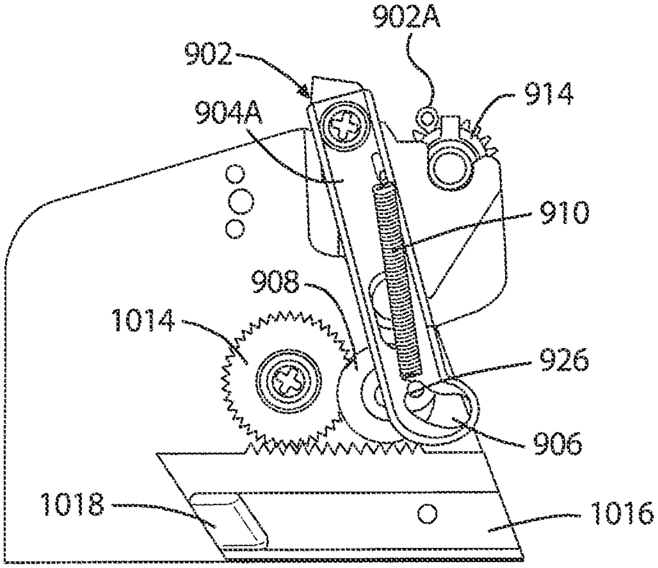
Figure 10G:
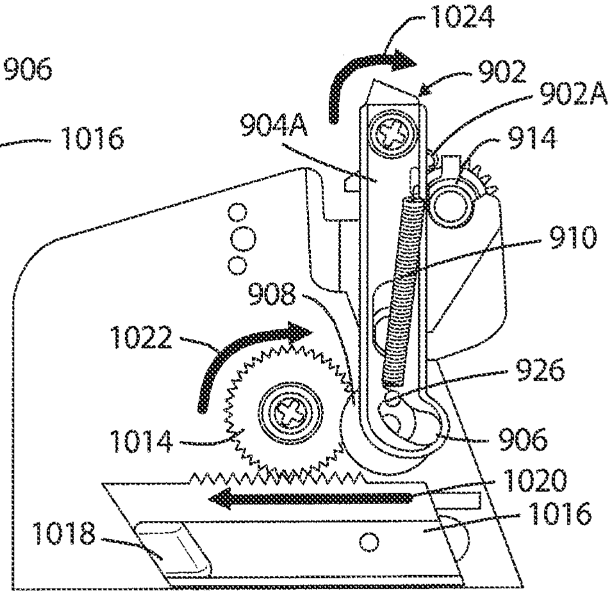
Figure 10H:
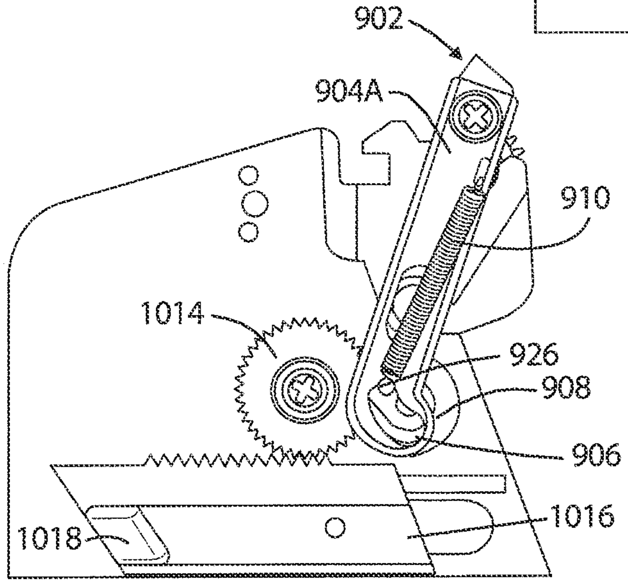
Figure 10J:
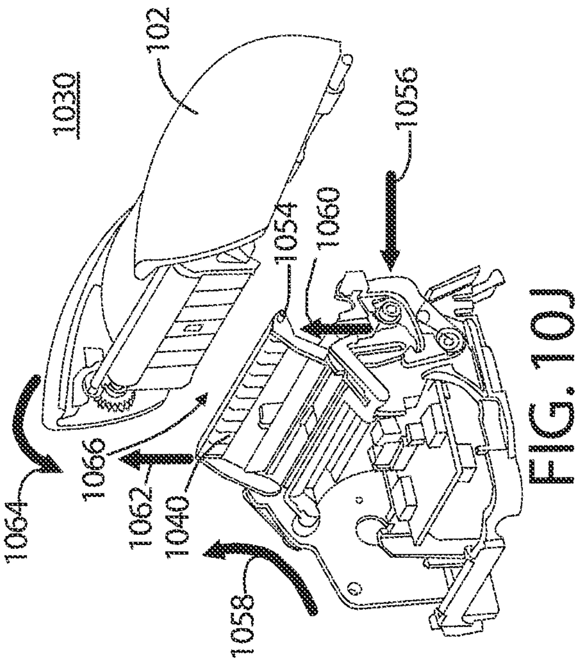
Figure 10L:
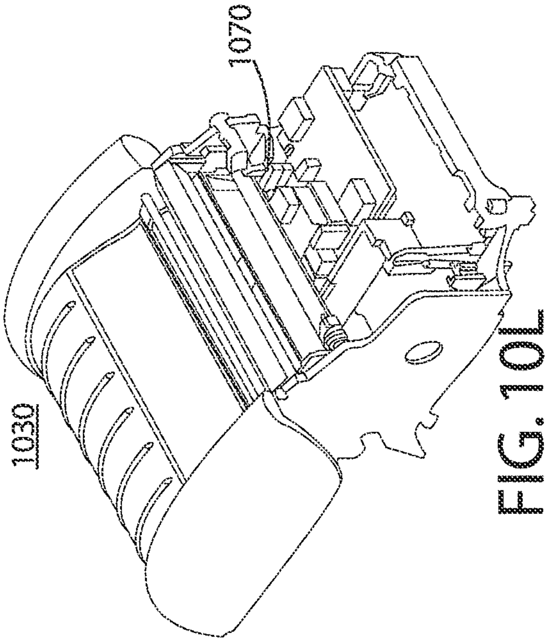
Figure 10I:
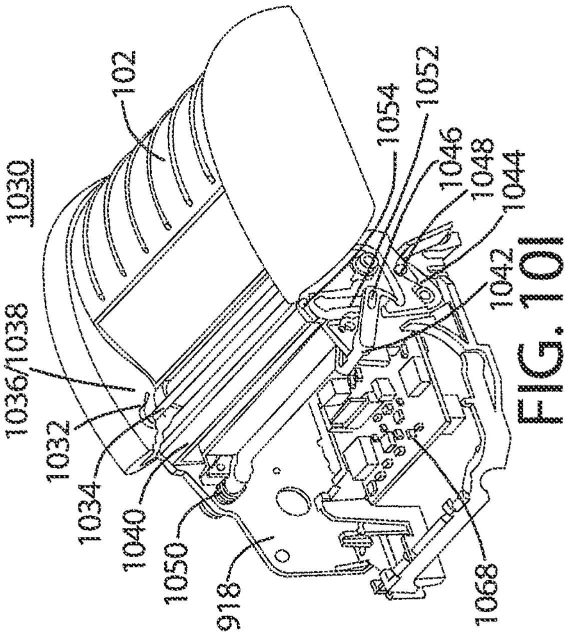
Figure 10K:
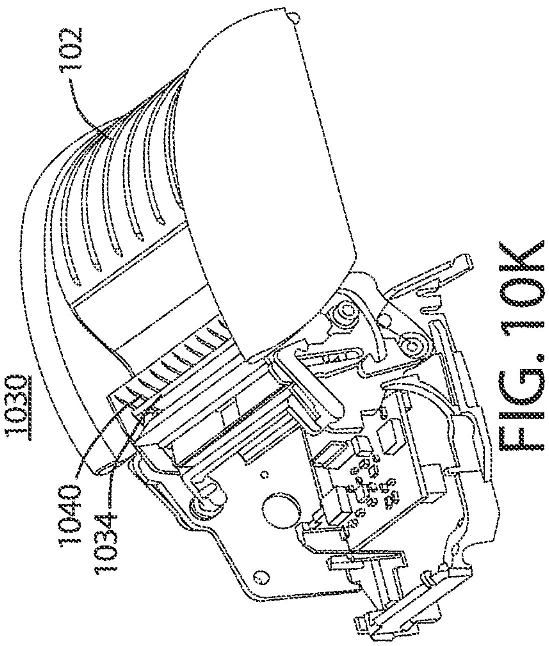
Figure 10M:
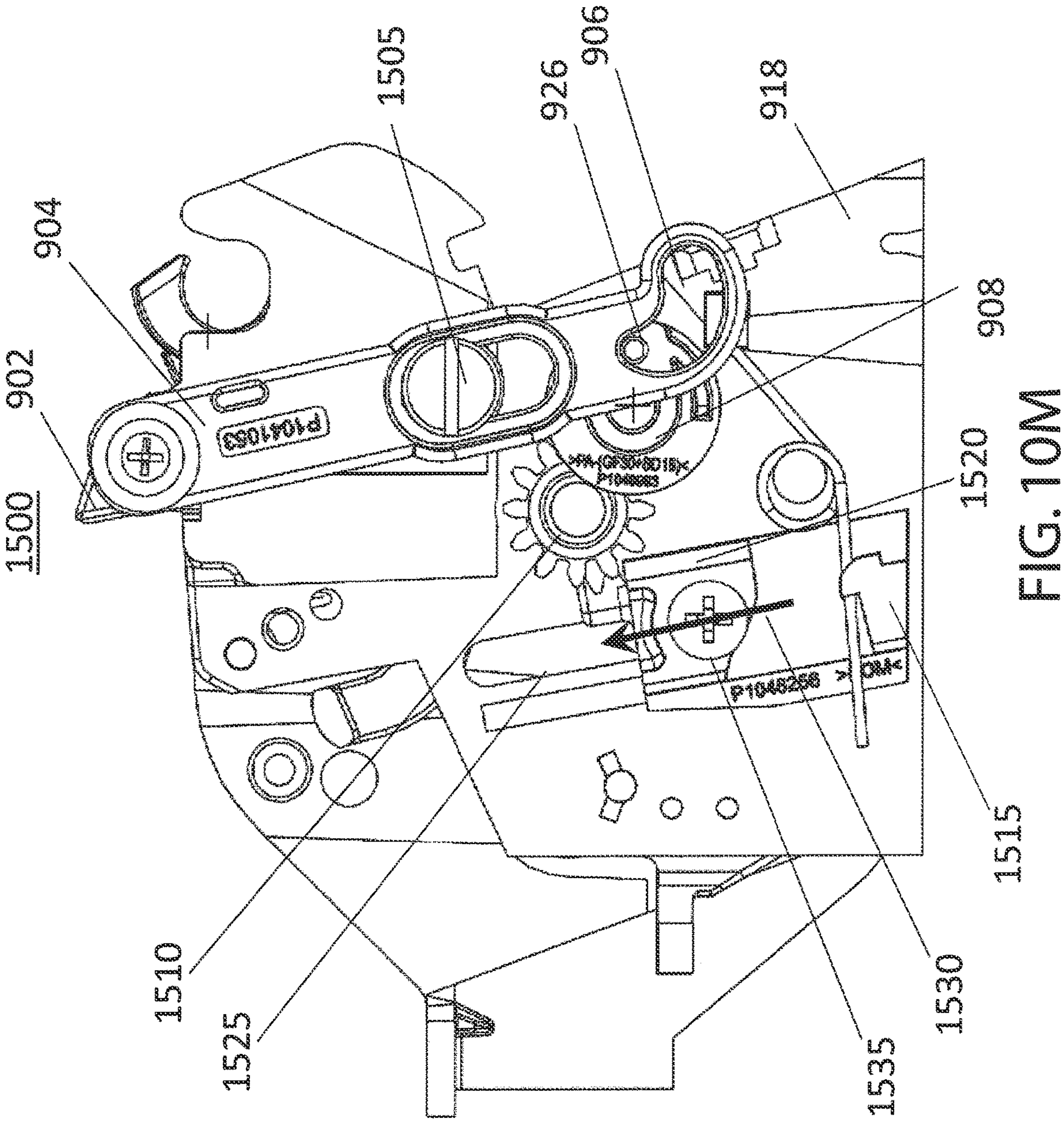
Figure 10N:
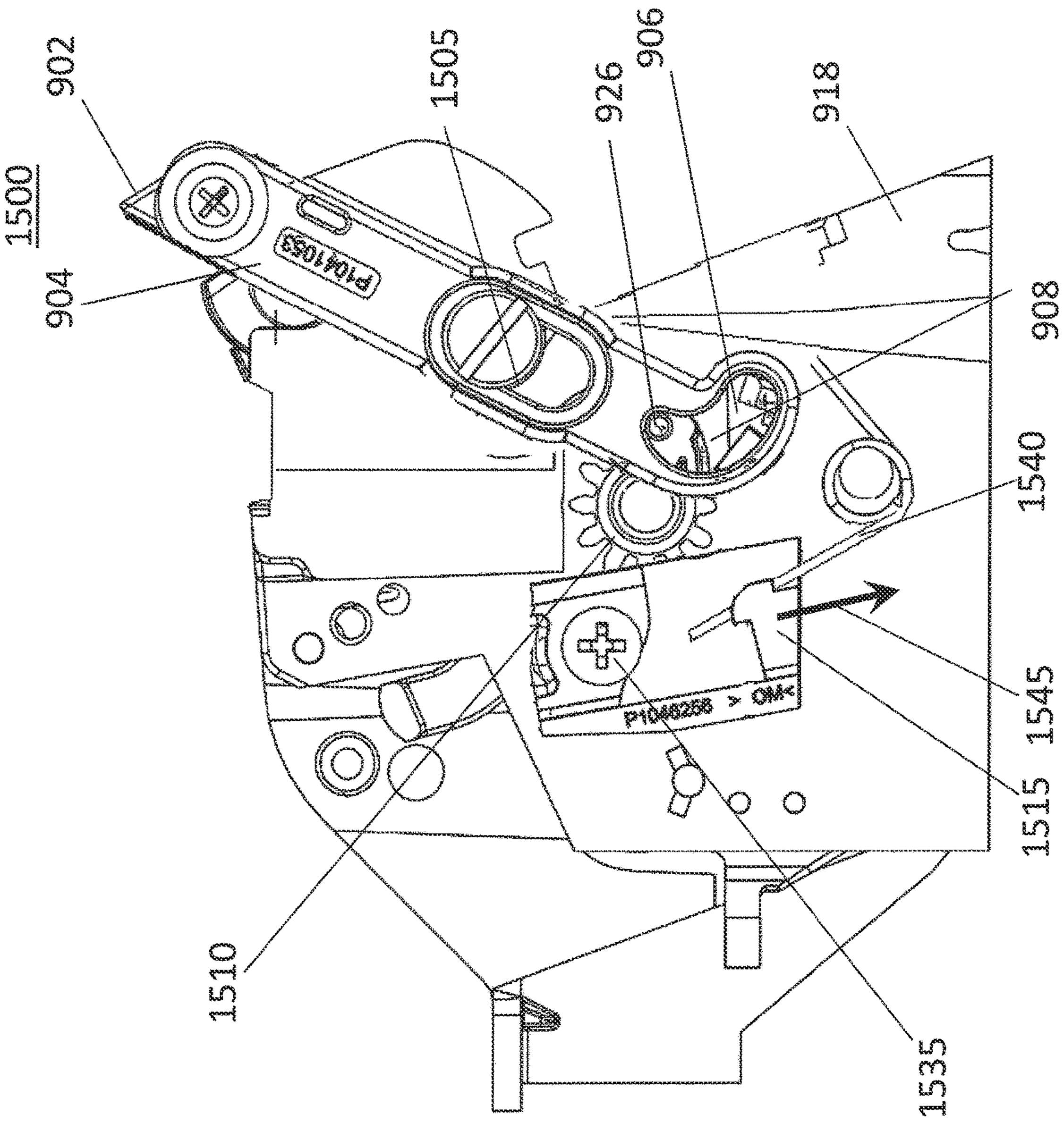
Figure 10P:
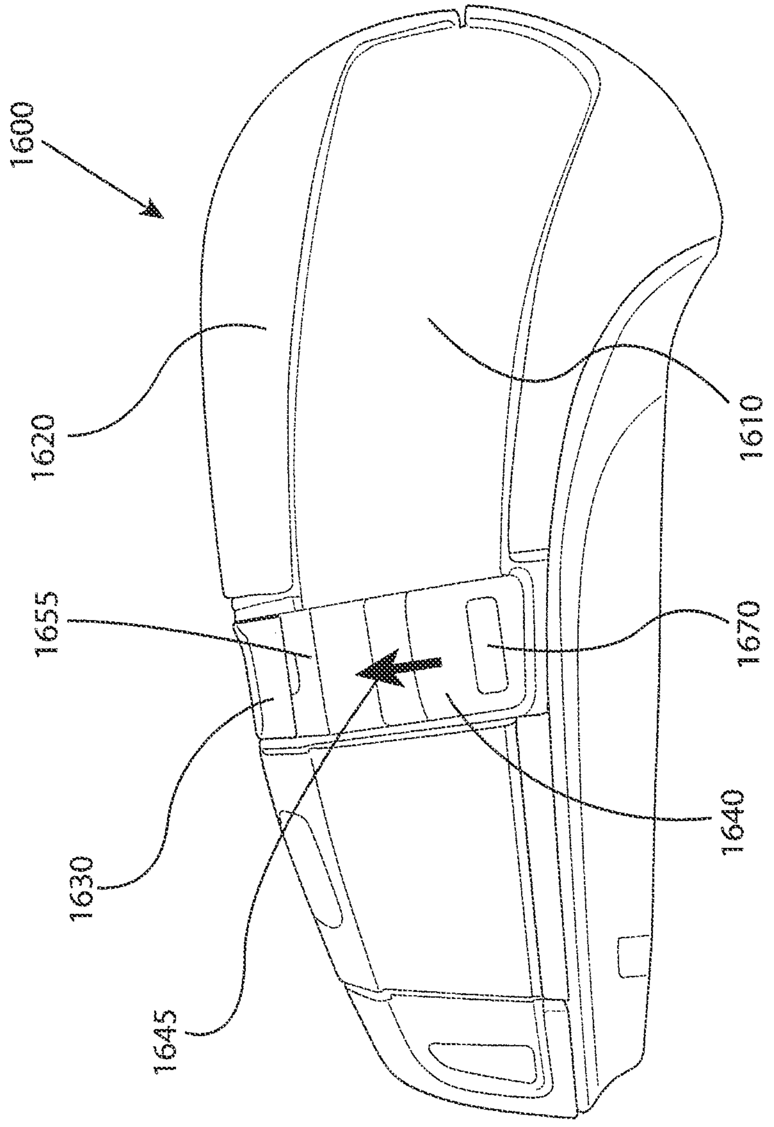
Figure 10Q:
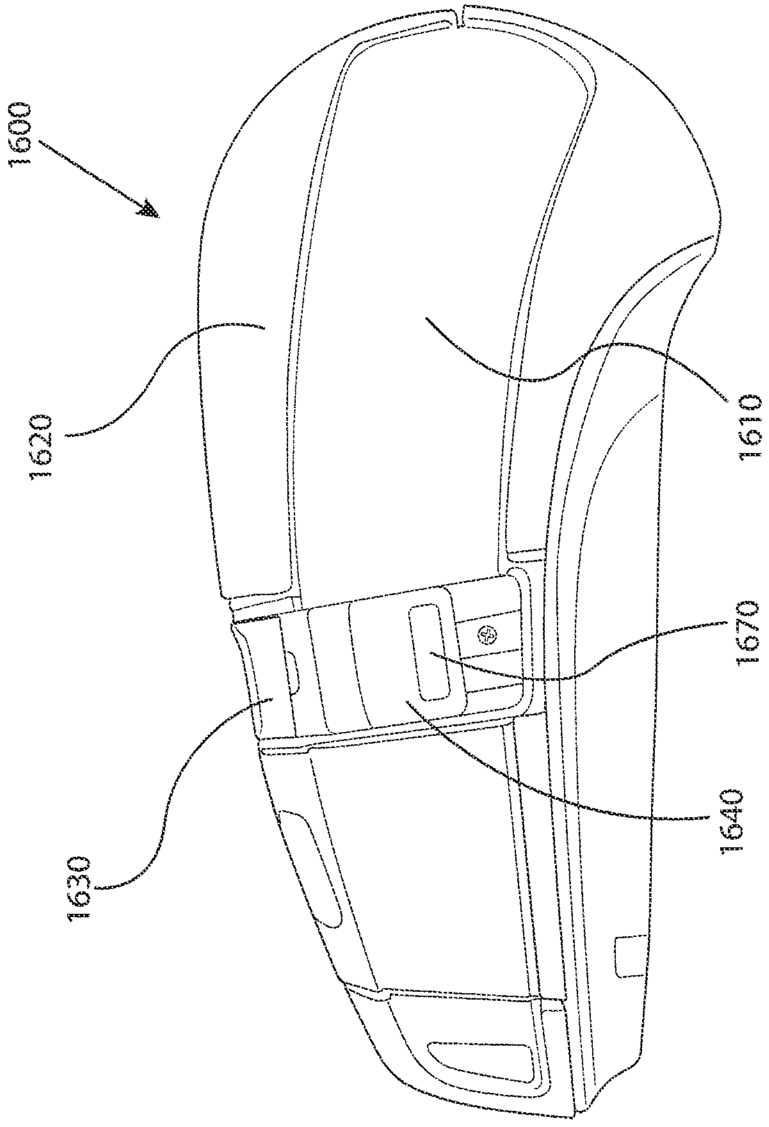
Figure 10R:
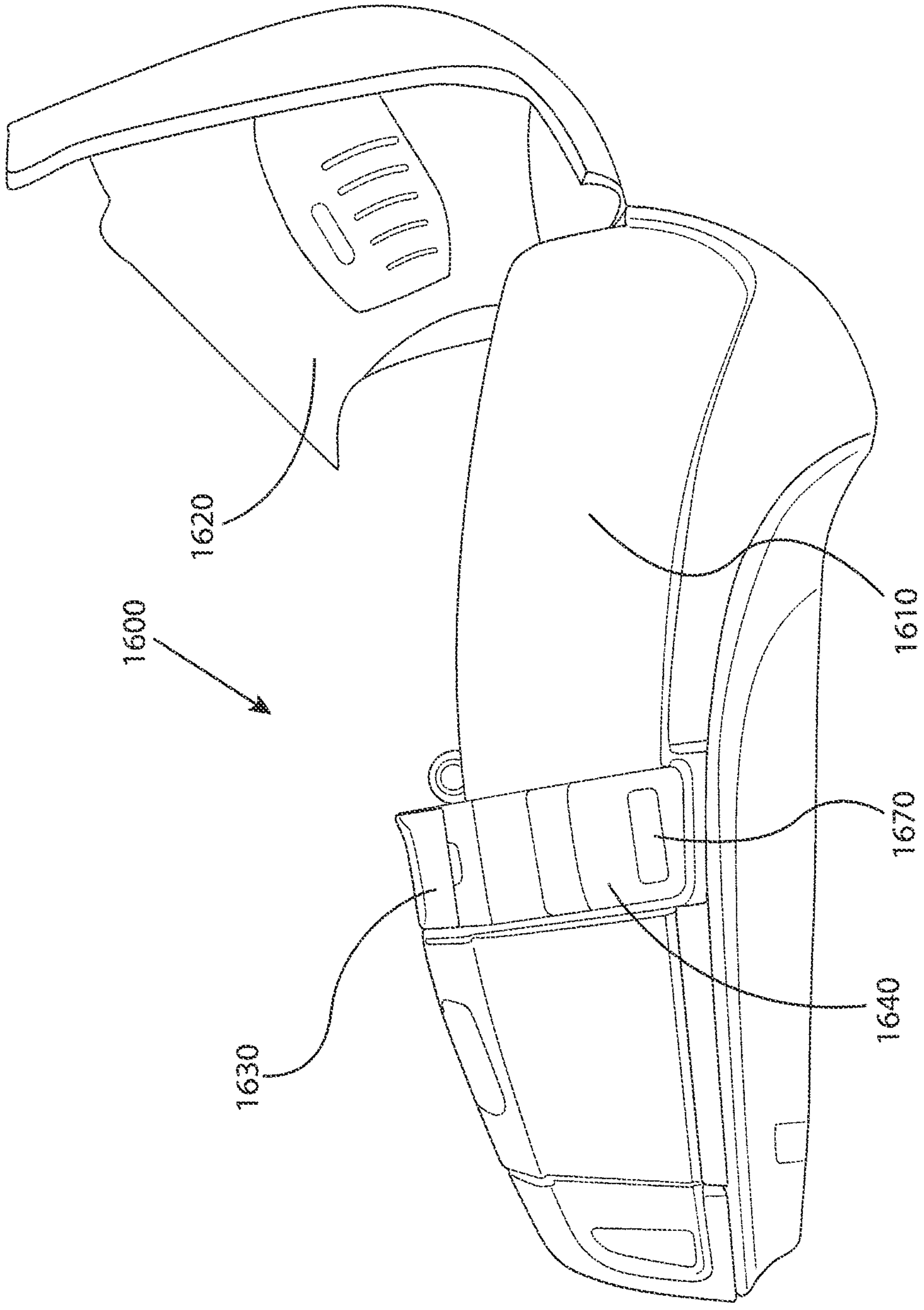
Figure 10S:
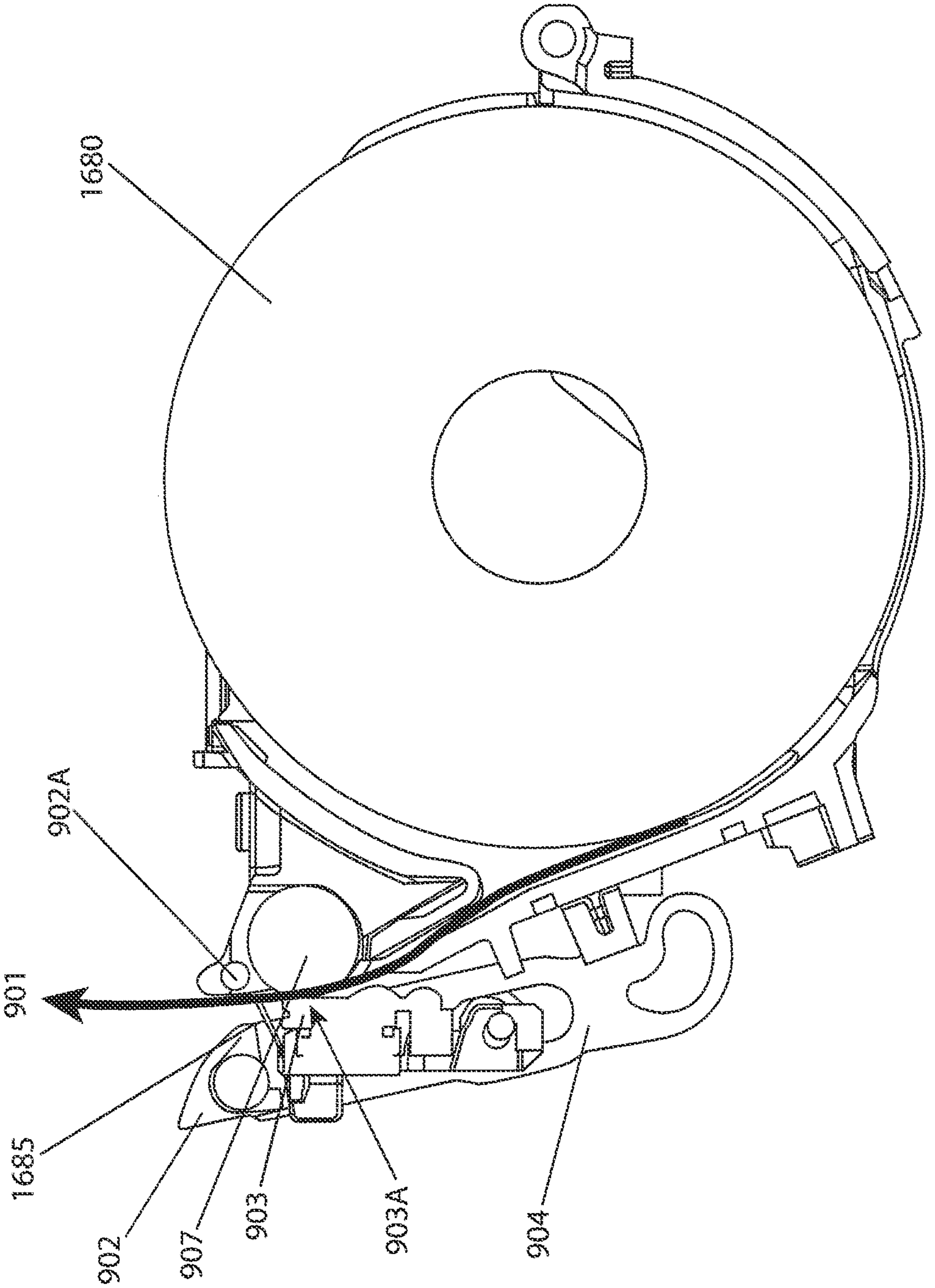
Figure 10T:
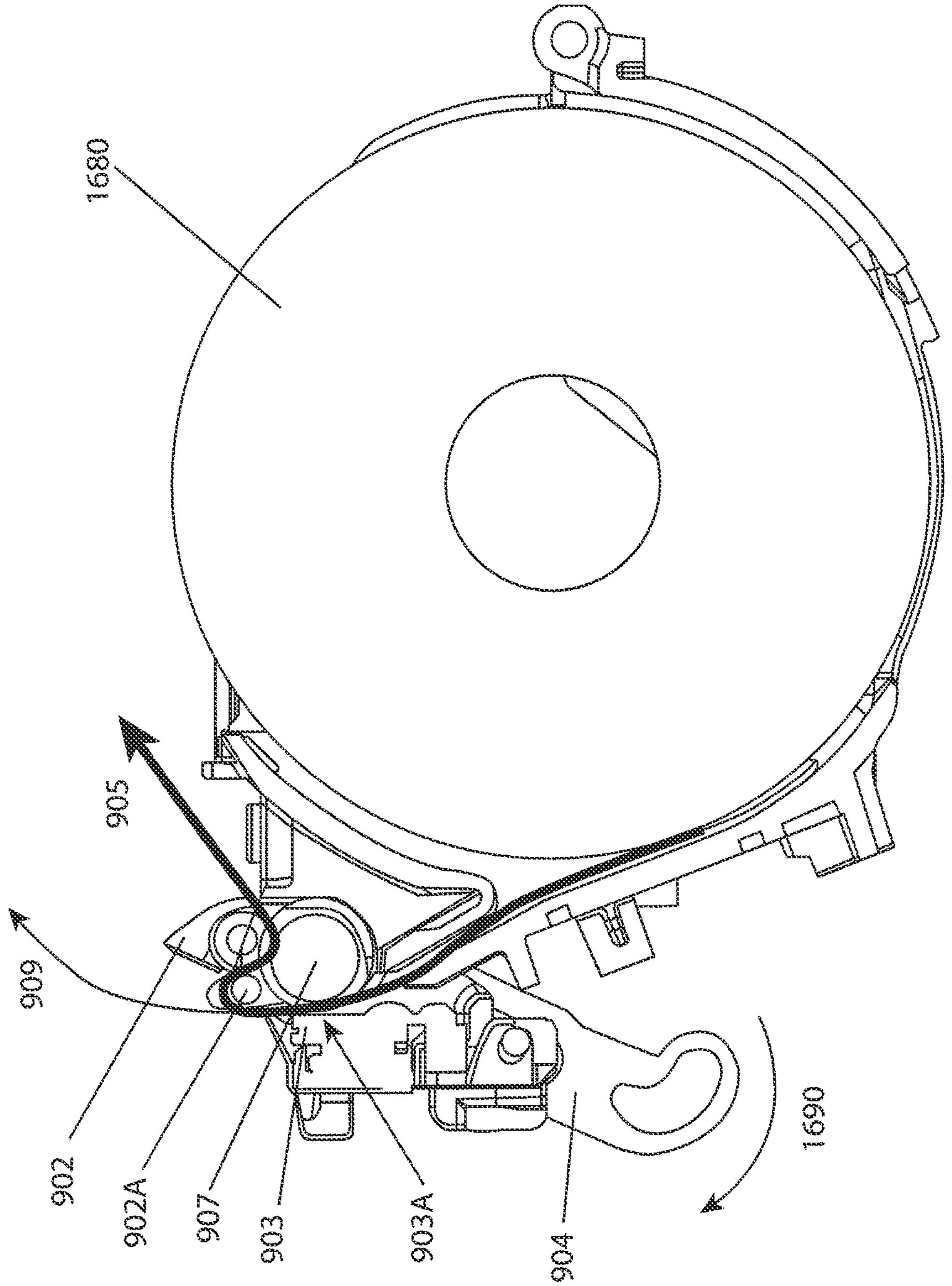
Figure 11A:
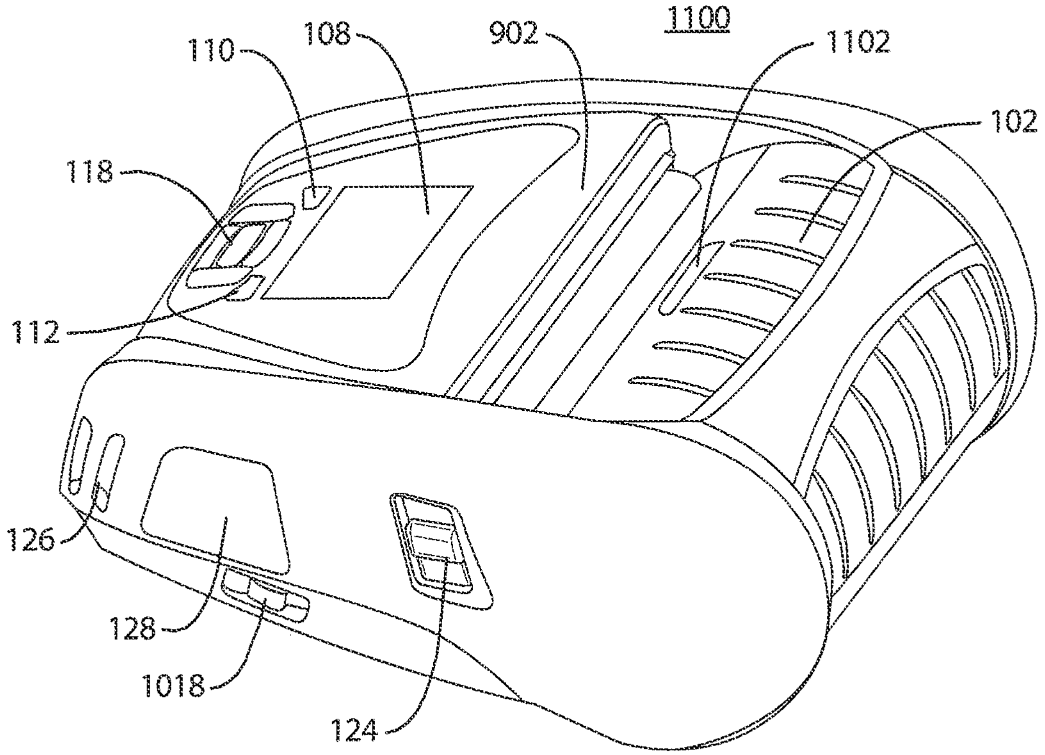
Figure 11B:
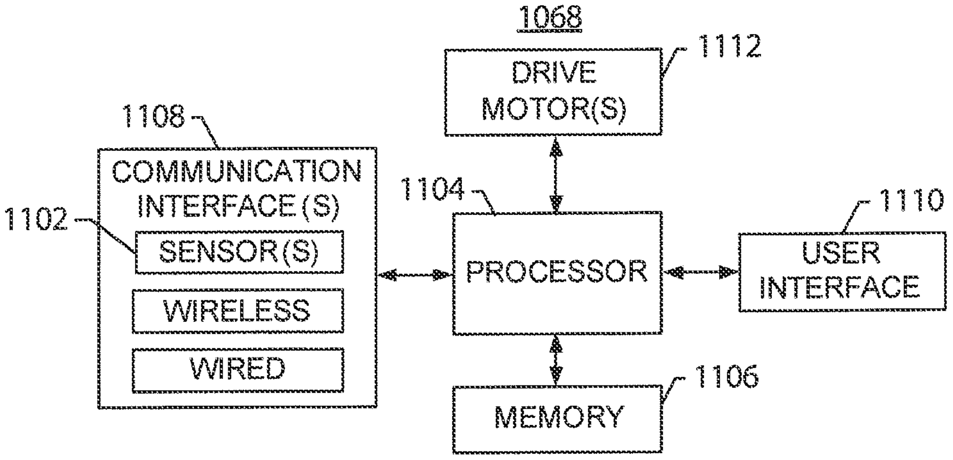
Figure 12:
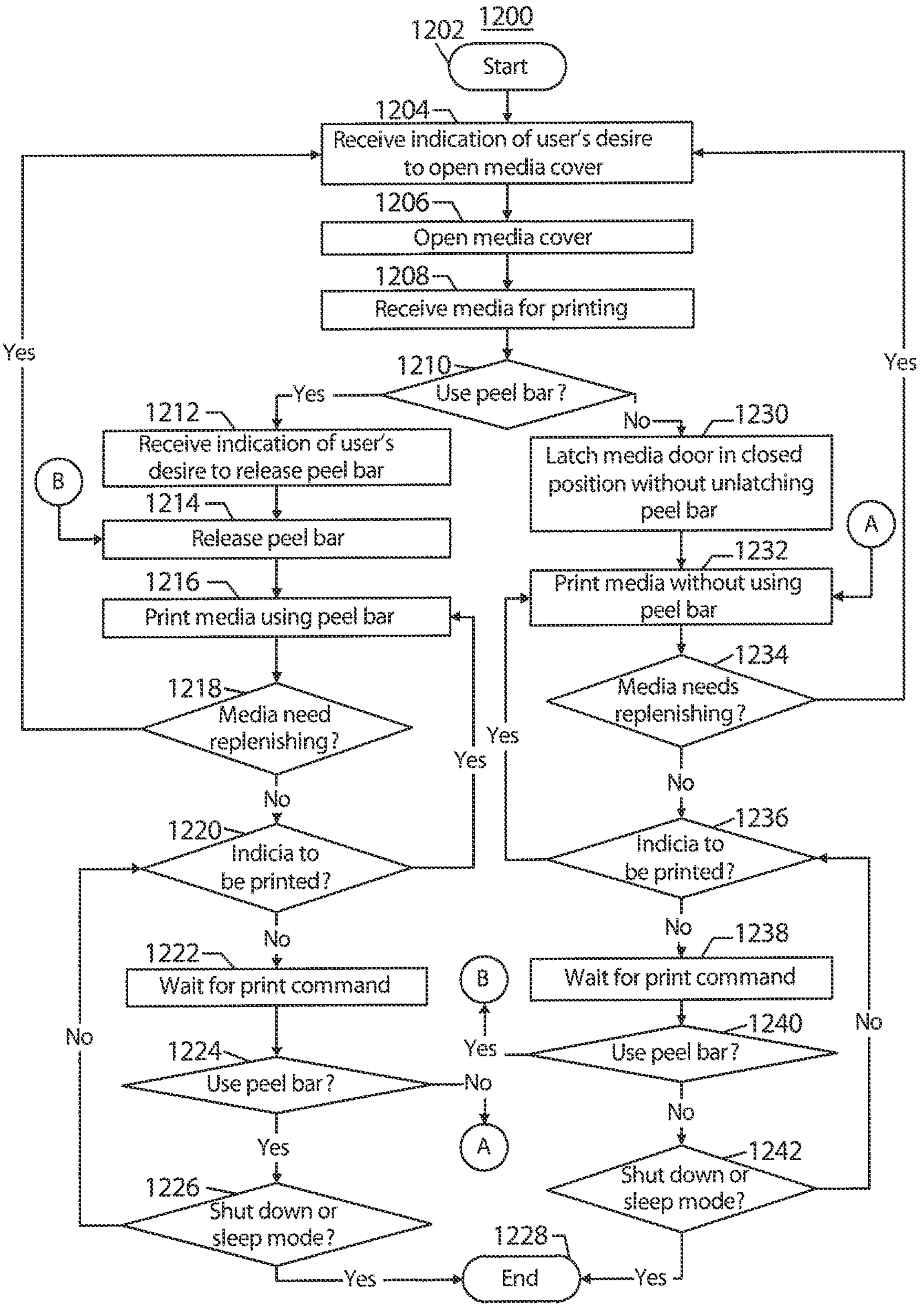
Figure 13:
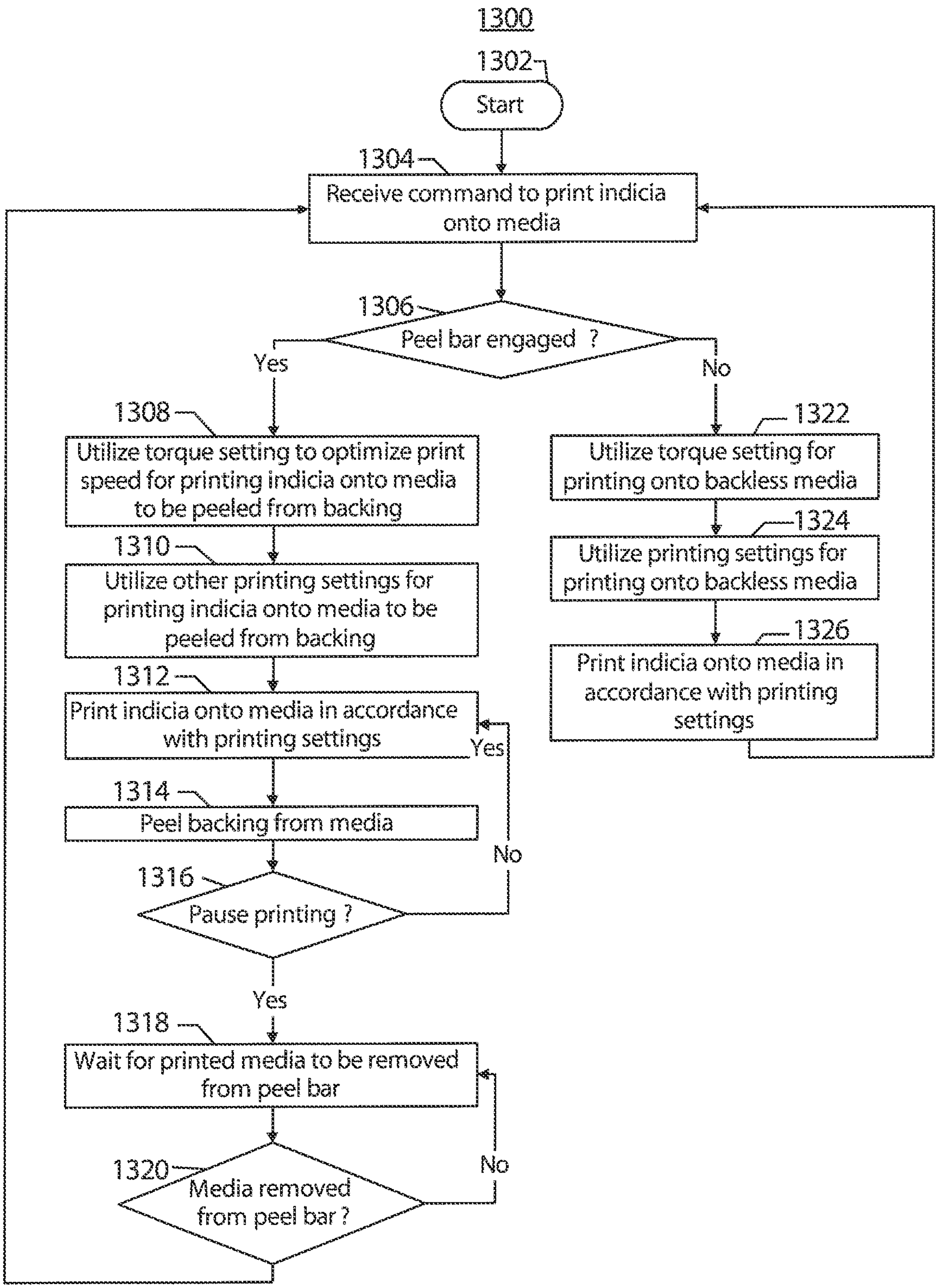
Figure 14A:
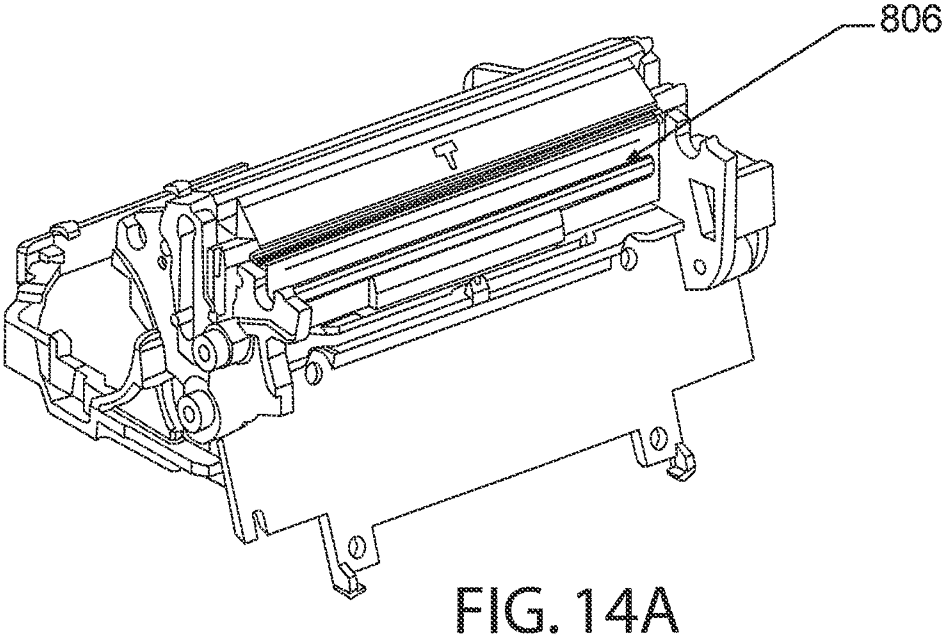
Figure 14B:
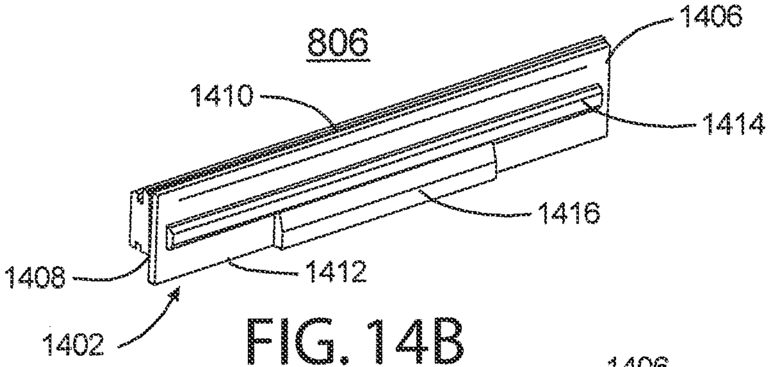
Figure 14C:
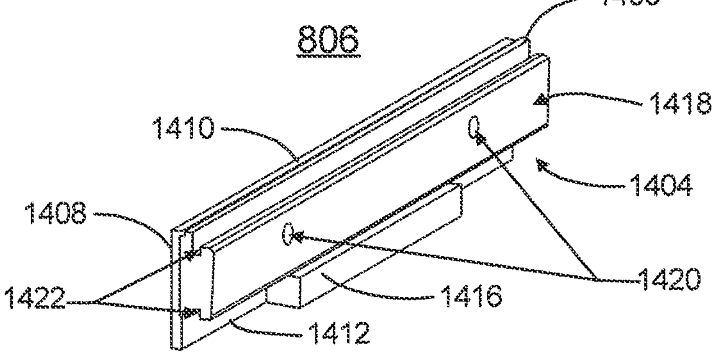

FIGS. 6A and 6B each show a right side view of a mobile printer in accordance with example embodiments of the present invention;

FIG. 7 shows a top view of the mobile printer discussed in connection with FIG. 2;

FIGS. 8A-8D show a series of isometric views of the mobile printer discussed in connection with FIG. 2 to illustrate a process of loading print media into the mobile printer and engaging the media using a peeler in accordance with some embodiments discussed herein;

FIGS. 9A and 9B show an example peeler assembly in accordance with some embodiments discussed herein;

FIGS. 10A-10C show an example process for transition of peeler assembly of FIGS. 9A and 9B from a non-peeling position to a ready position (or vice-versa) and from the ready position to a peeling position (or vice-versa);

FIGS. 10D and 10E show another example peeler assembly in accordance with some embodiments discussed herein;

FIGS. 10F-10H show an example process for transitioning the peeler assembly of FIGS. 10D and 10E from a non-peeling position to a ready position (or vice-versa) and from the ready position to a peeling position (or vice-versa);

FIGS. 10I-10L show another example the peeler assembly and process for transitioning from a non-peeling position to a ready position (or vice-versa) and from the ready position to a peeling position (or vice-versa);

FIGS. 10M-10N illustrates another example of a peeler assembly and process for transitioning from a peeling position to a non-peeling position (or vice-versa);

FIGS. 10P-10R illustrate an example embodiment of a printer implementing the peeler assembly of FIGS. 10M-10N;

FIG. 10S illustrates a cross section of a portion of a printer according to an example embodiment of the present invention depicting a media path for a peeler assembly in a non-peeling position;

FIG. 10T illustrates a cross section of a portion of a printer according to an example embodiment of the present invention depicting a media feed path for a peeler assembly in a peeling position;

FIG. 11A shows an isometric view of a printer in accordance with some embodiments discussed herein;

FIG. 11B shows an example block diagram of circuitry that may be included in some embodiments discussed herein;

FIG. 12 shows a process flow related to using a peeler bar that may be executed by a processor and/or other hardware at least partially implemented in a printer in accordance with some embodiments discussed herein;

FIG. 13 shows a process flow related to using a peeler sensor that may be executed by a processor and/or other hardware at least partially implemented in a printer in accordance with some embodiments discussed herein; and FIGS. 14A-14C show examples of a universal printhead that may be incorporated in a printer in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview of Example Printer Platforms

Figure 1:
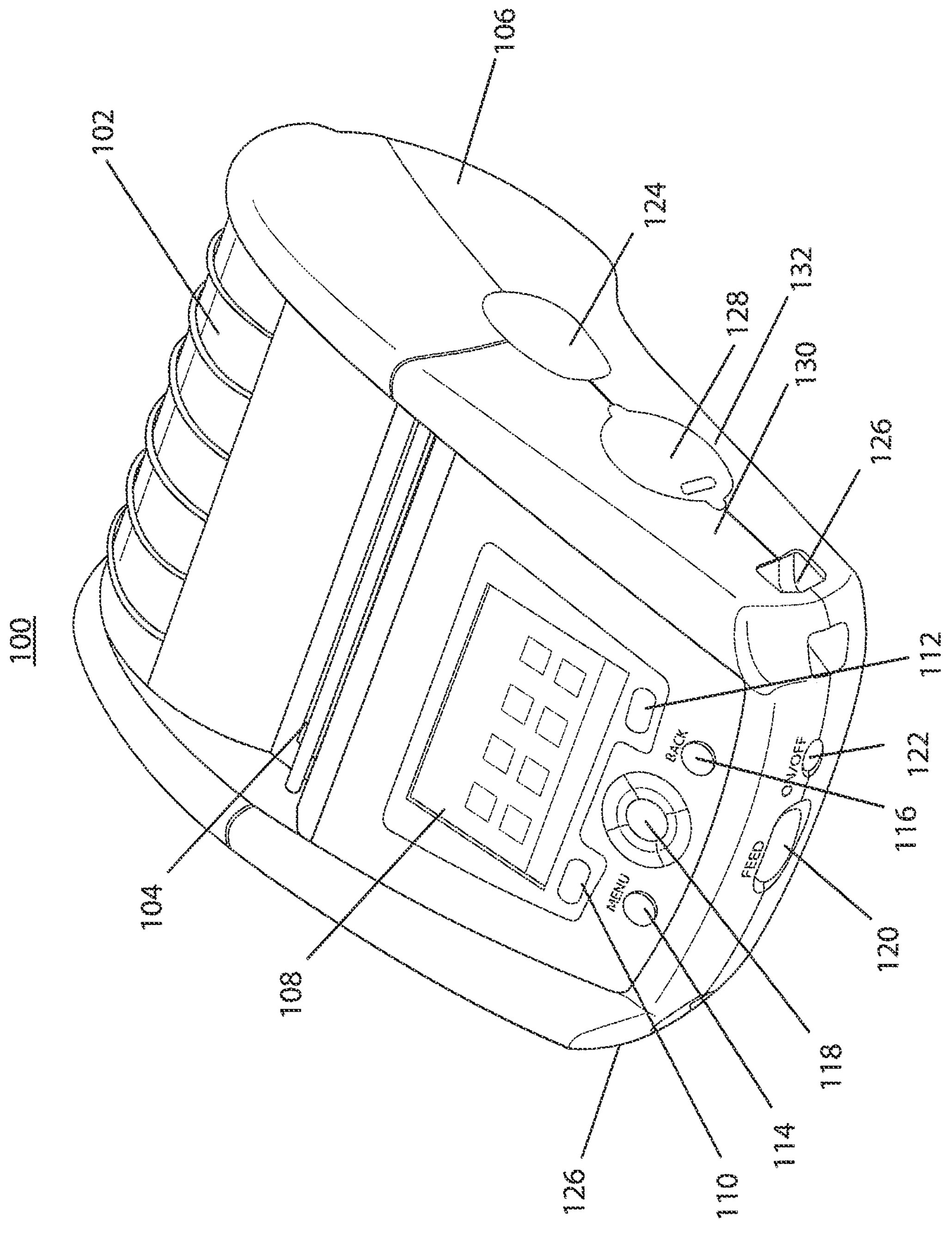
FIG. 1 shows an isometric view of a mobile printer in accordance with additional embodiments discussed herein.

FIG. 1 shows mobile printer 100, which is in accordance with some embodiments of the present invention. Mobile printer 100, like some of the other exemplary printers discussed herein, can weigh less than 1.6 pounds, can have a volume of about 61 cubic inches, and can be durable enough to function properly after falling from a height of at least 5 feet. Mobile printer 100 can also be used to print user-readable indicia at, e.g., a speed of one or more inches per second. In some embodiments, the torque and/or print speed can be dynamically adjusted based upon drive motor and/or any other type of the printing parameters selected in response to the printer's processor determining, e.g., the type of media (e.g., backless media, media with backing to be peeled, among others). Mobile printer 100 can also be configured to encode machine-readable indicia onto media.

The relatively small profile and increased durability of mobile printer 100 can be enabled by, among other things, the arrangement of the internal circuitry and/or circuit boards onto which the circuitry is mounted. For example, the circuitry of mobile printer 100 can be laid out on a plurality of circuit boards (instead of a single circuit board). Additional examples of how circuitry may be arranged on one or more circuit boards are discussed in commonly-assigned U.S. patent application Ser. No. 13/085,438, titled "PRINTER MOBILITY AND SCALABILITY," which is incorporated herein in its entirety by reference.

The media can include, for example, a number of adhesive-backed labels supported by a backing or other carrier. The backing is typically a paper strip coated with silicone to facilitate easy removal of the adhesive backed label, commonly called liner, but could be any other type of carrier, even a multi-layer or "piggyback" labels designed for specific printing of multi-part documents. In RFID applications, the labels may include an RFID transponder or other type of circuitry (sometimes referred to herein as an "inlay"). A peeler (discussed further in connection with FIGS. 7-13) and/or other component(s) can be included in mobile printer 100 and may be used to separate the media from the backing after printing/encoding. The media can include a single media unit, or the media can include individual media units that are rolled together, fan-folded, or otherwise assembled together, and inserted into mobile printer 100. For example, media cover 102 can open (similar or the same as that shown in FIGS. 8A and 8B) allowing mobile printer 100 to receive a single media unit, a roll of media units, a fanfold of media units, or any other suitable arrangement of one or more media units. Mobile printer 100 can then feed the media through media slot 104. In some embodiments, a tear bar or other type of cutting component (discussed below) can be incorporated near media slot 104 to help the user remove a label, receipt, or other type of media from the roll after printing/encoding.

A peeler assembly, such as that discussed in connection with FIGS. 9A-10C and/or 10D-10T, may also be included in mobile printer 100. The peeler assembly may comprise a peel bar and/or other component(s) (including those discussed in reference to FIGS. 8A-10R), and be positioned proximate media slot 104. Mobile printer 100 may include gears and/or other components that are adapted to engage the peeler to print media (such as, e.g., media cover 102 may be configured to latch the peel bar in a peeling position), subsequent to the peel bar being released from its stowed or other type of non-peeling position by a user and/or mobile printer 100. The peeler assembly can then be used to at least partially remove a label or other type of media from any type of backing, such as a media liner, after printing/encoding the media.

Housing 106, including media cover 102, can be made from any suitable material and/or combinations of materials. For example, housing 106 can be made from plastic(s), rubber, metal, composite material, any other type of material, or combination thereof (such as, e.g., a rubber-infused plastic). Housing material 106 can be strong enough to protect the internal components from a fall, while still allowing wireless signals to radiate through in at least some locations. Housing 106 is shown in FIG. 1 as having a center seam between top half 130 of the housing and bottom half 132 of the housing. Other embodiments, examples of which are discussed below (in connection with, e.g., FIGS. 4-8B), include a seam line that allows, among other things, the bottom portion of the housing to be the same size and shape, regardless of the overall shape and size of printers. Additional examples of defining shells and other shape defining housing portions of printers that may be used in some embodiments discussed herein are provided in commonly-assigned U.S. patent application Ser. No. 13/085,438, titled "PRINTER MOBILITY AND SCALABILITY," which is incorporated herein in its entirety by reference.

Mobile printer 100 can also include one or more user input/output components, such as display 108, left button 110, right button 112, menu button 114, back button 116, navigation buttons 118, feed button 120, power button 122, and cover release actuator 124. Other examples of buttons, sensors and other type of user and environmental inputs may be included, some of which are discussed herein. For example, additional user inputs and/or outputs may be available to the user only when media cover 102 is open. Additional examples of printer user interfaces that may be used in some embodiments discussed herein are provided in commonly-assigned U.S. patent application Ser. No. 13/085,438, titled "PRINTER MOBILITY AND SCALABILITY," which is incorporated herein in its entirety by reference.

Display 108 can include components configured to receive data inputs and present a display. In some embodiments, display 108 may also include components that enable touch-sensitive functionality. The touch-sensitive components of display 108 can include, for example, capacitance sensor(s), resistance sensor(s), acoustic wave sensor(s), optical sensor(s), any other type of sensor(s), and/or combination thereof. Display 108 can also include a liquid crystal display ("LCD"), light emitting diode ("LED") display, an organic light emitting diode ("OLED") display, any other type of display, or combination thereof. Different types of displays have various advantages and disadvantages relative to each other. For example, a 2.1 inch OLED display may have a relatively larger viewing angle than a 2.1 inch LCD. However, as known to those skilled in the art, OLED displays are currently more expensive than comparable LCDs. Other examples of displays that may be used by some embodiments discussed herein include an electronic paper display ("EPD," sometimes referred to as electronic ink or e-ink) or other type of bi-stable display(s). Power consumption, brightness, readability (in sunlight, darkness, etc.), expected life span, and other factors may also differ among different types of displays and impact the best display to be used as display 108 depending on the intended usage of mobile printer 100. In some embodiments, an ambient light sensor and/or other type of sensor can be integrated into the display and/or other portion of printer 100, such as in and/or near the peeler bar or media cover. The one or more sensors can be used to, for example, adjust the brightness of the display, detect a label that needs to be removed from the peel bar, and determine when printer 100 is moving, among other things.

Display 108 can be configured to present an icon based menu and/or any other type of menu hierarchy. Among other things, display 108 can be adapted to display Asian-language fonts in relatively high resolution. Various fonts, firmware and/or other data may be downloaded onto printer 100 (some examples of which are discussed further below).

In some embodiments, display 108 may only function as an output display component and be unable to function as an input component. For example, display 108 may lack a functioning touch-sensitive input component and/or the appropriate software/hardware/firmware necessary to enable the touch-sensitive input component.

Regardless of whether display 108 includes a touch sensitive component that displays user-selectable buttons, mobile printer 100 can include "soft" keys, such as left button 110 and right button 112, which are hardware-based keys (as opposed to software-based keys presented by a touch-sensitive display) that can be used to select options presented by display 108. In some embodiments, portions of the screen of display 108 can be dedicated to and associated with left button 110 and/or right button 112. For example, the area of display 108 located immediately above left button 110 can be used to present an option that can be selected in response to left button 110 being depressed. Likewise, the area of display 108 located immediately above right button 112 can be used to present another option that can be selected in response to right button 112 being depressed. The options presented in the screen areas associated with left button 110 and/or right button 112 can be dynamic and change based upon the current display, allowing left button 110 and right button 112 to provide flexible navigation of the menu hierarchy. Additional examples of printer user interfaces that may be used in some embodiments discussed herein are provided in commonly-assigned U.S. patent application Ser. No. 13/085,438, titled "PRINTER MOBILITY AND SCALABILITY," which was incorporated herein in its entirety by reference.

Mobile printer 100 can also include menu button 114. Internal circuitry (e.g., the processor and/or other components, such as those discussed in connection with FIG. 11B) of mobile printer 100 can be configured to, for example, present a main menu or other type of display on display 108 in response to menu button 114 being depressed. Software and/or firmware, which include coded machine-readable instructions for executing the functionality of mobile printer 100, can be stored in memory or any other type of computer readable media device included in mobile printer 100. For example, mobile printer 100 may include 128 megabytes of memory, 256 megabytes of memory, or any other suitable amount of removable or embedded memory in the form of volatile and/or non-volatile storage (e.g., flash memory, magnetic disk memory, etc.).

Figure 8A:
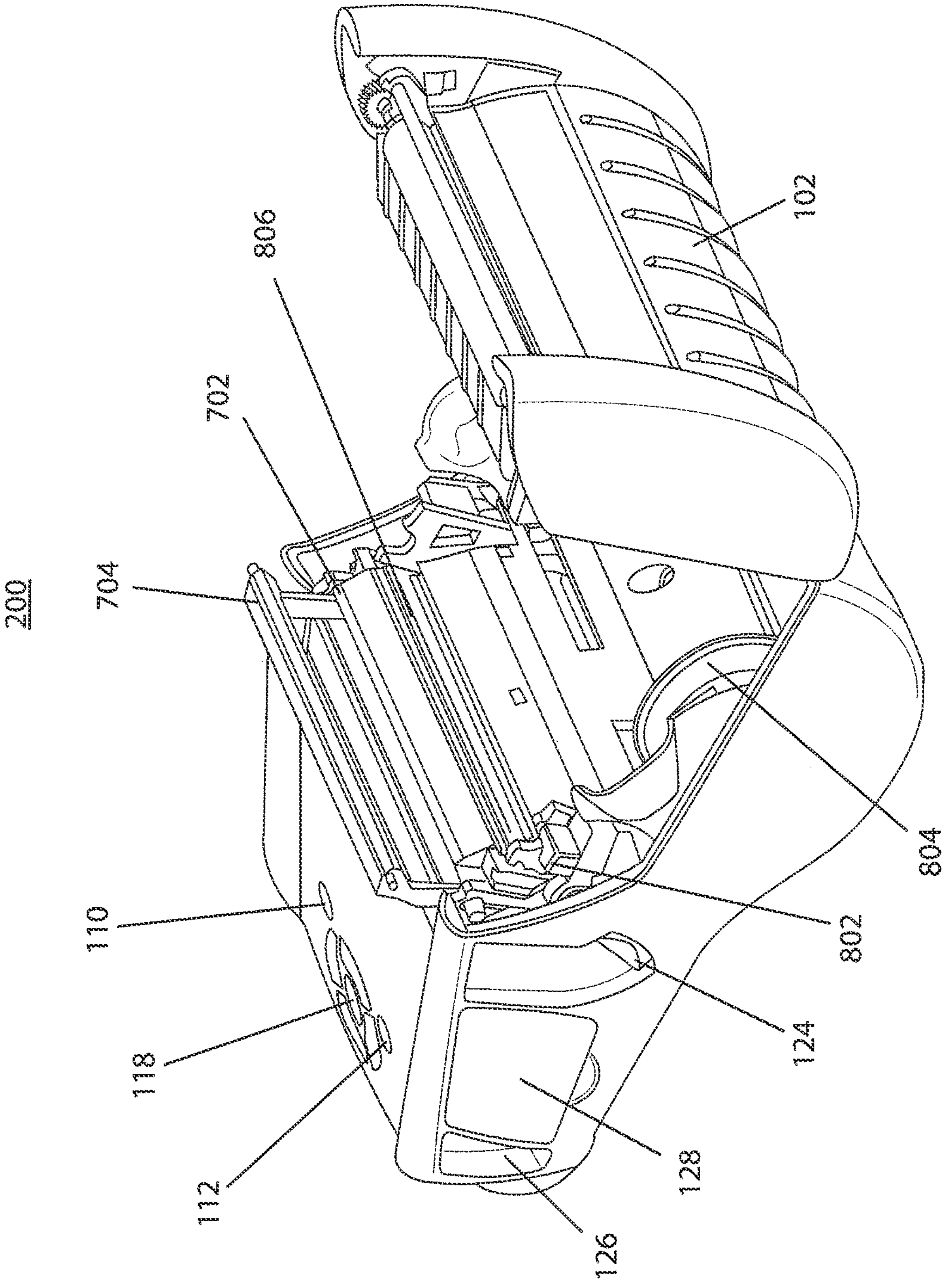
Figure 8B:
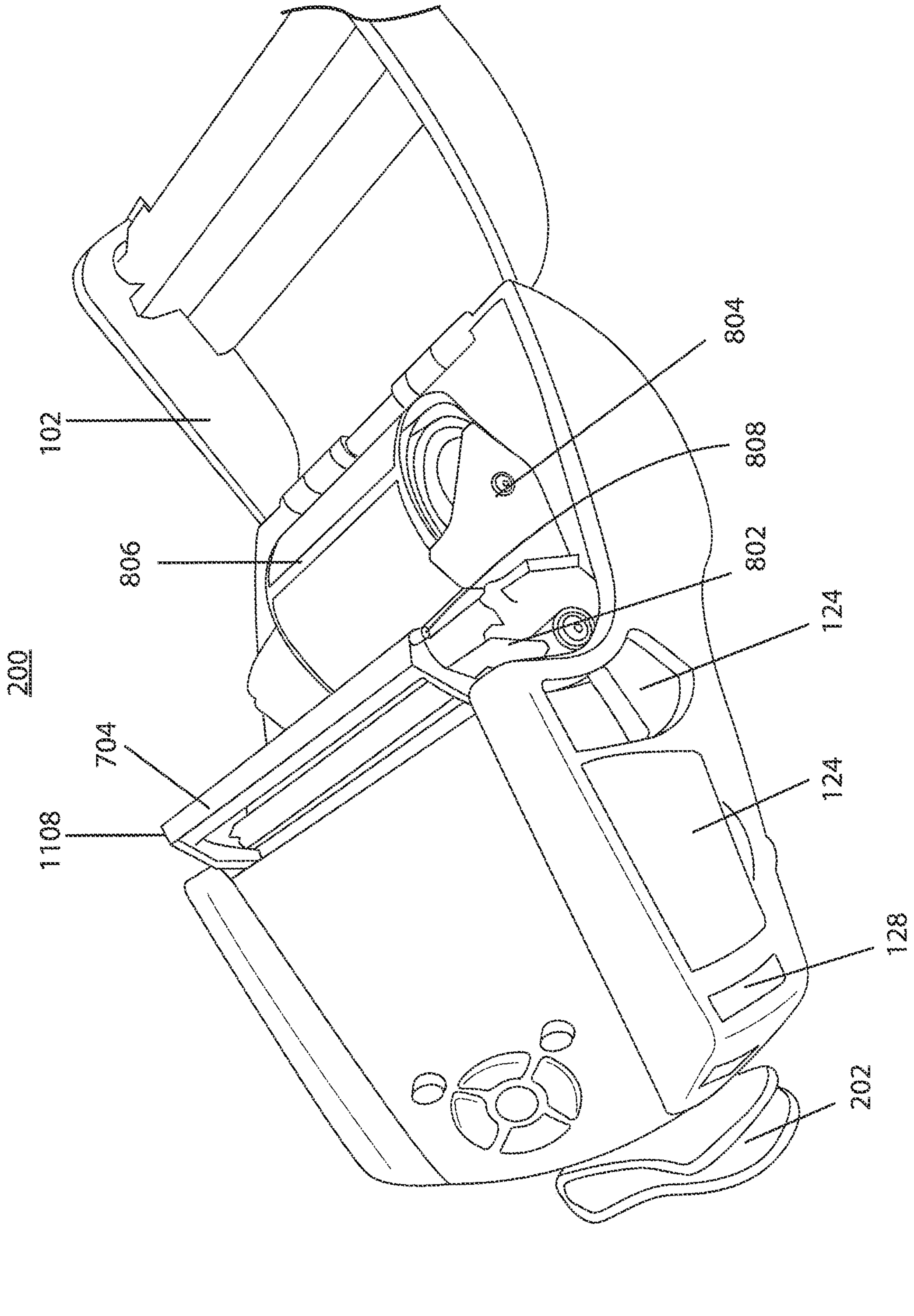

Back button 116 can cause the internal circuitry to present a display that is higher up a menu hierarchy of mobile printer 100. In other embodiments, back button 116 (or another button which is not shown) can be used to physically "back-up" or otherwise control the movement of the media being printed/encoded by mobile printer 100. In yet other embodiments, back button 116 (and/or any other component of mobile printer 100) can have dynamic functionality, in that selecting back button 116 causes mobile printer 100 to respond differently depending on a range of variables. For example, back button 116 may cause display 108 to advance up the menu hierarchy while media cover 102 is in a closed position (as shown in FIG. 1) and cause the printing media to back-feed while media cover 102 is in an open position (as shown in FIGS. 8A and 8B), or vice-versa.

Navigation buttons 118 are shown in FIG. 1 as comprising four directional buttons and a center button. Navigational buttons 118 can enable a user to, for example, move a cursor among and/or select one or more options presented by display 108. Navigational buttons 118 can also provide an intuitive interface for allowing a user to move to and/or select an option using fewer key presses. Additional examples of printer user interfaces that may be used in some embodiments discussed herein are provided in commonly-assigned U.S. patent application Ser. No. 13/085,438, titled "PRINTER MOBILITY AND SCALABILITY," which was incorporated herein in its entirety by reference.

Mobile printer 100 can be powered ON and OFF using power button 122. In some embodiments, power button 122 can be used to cause mobile printer 100 to enter or exit a standby mode. For example, in response to power button 122 being depressed for less than a predetermined period of time (e.g., 5 seconds), mobile printer 100 can either enter or exit standby mode (depending on whether or not mobile printer 100 is currently in an active or standby mode). But in response to power button 122 being depressed for more than 5 seconds, mobile printer 100 can power OFF (if ON). In some embodiments, the circuitry of mobile printer 100 can be configured to automatically power OFF after a predetermined period of time or in response to determining the battery power has dropped below a predetermined threshold. Mobile printer 100 may also be configured to power ON automatically, for example, in response to a print command being issued by another device. In some embodiments, mobile printer 100 can be configured to automatically enter and/or exit a stand-by or other power-saving mode (including dimming the display screen, turning OFF wireless components, and/or execute other power reduction configuration settings). For example, a power-saving mode may be entered or exited after a predetermined period of time has elapsed and/or an environmental trigger has been detected (e.g., light detected by an ambient light sensor, movement detected by a jiggle switch, accelerometer and/or other type of movement sensor, etc.).

Cover release actuator 124 can be used to unlock and/or open media cover 102. When media cover 102 is open (as shown in FIGS. 8A and 8B), media can be loaded into mobile printer 100, media jams can be fixed, ribbon or other printing components can be replaced, the peeler bar can be released to engage the media, etc.

The relatively small size of mobile printer 100 allows mobile printer 100 to be attached, mounted, or otherwise physically coupled to a number of devices. For example, mobile printer 100 can be attached to a fork lift (or other warehouse apparatus), automobile (e.g., police car), healthcare device, shopping cart, belt loop, belt, and lanyard, among other things. To facilitate its mechanical or other type of physical coupling to another apparatus, mobile printer 100 can include channels 126, which are adapted to receive a mounting component (e.g., a shoulder strap, belt, or other type of tether), locking component, and/or other type of apparatus(es). Other mounting components, including those used for a dock, are provided in commonly-assigned U.S. patent application Ser. No. 13/085,431, titled "MOBILE PRINTER NETWORKING AND INTERFACING," which was incorporated herein in its entirety by reference.

Protective cover 128 can be used to prevent water, dirt and other elements from entering one or more electrical coupling components of mobile printer 100. For example, one or more universal serial bus ("USB") ports, mini-USB ports, a serial enhanced security ports, an Ethernet ports, an optical ports, and/or any other type of input components, output components and/or input/output components may be located behind protective cover 128. Media cover 128 can be removed and/or opened to access the protected component (s). The protected component(s) can also incorporate, for example, strain relief technology, some examples of which are provided in commonly-assigned U.S. patent application Ser. No. 13/085,438, titled "PRINTER MOBILITY AND SCALABILITY," which was incorporated herein in its entirety by reference.

Figure 2:
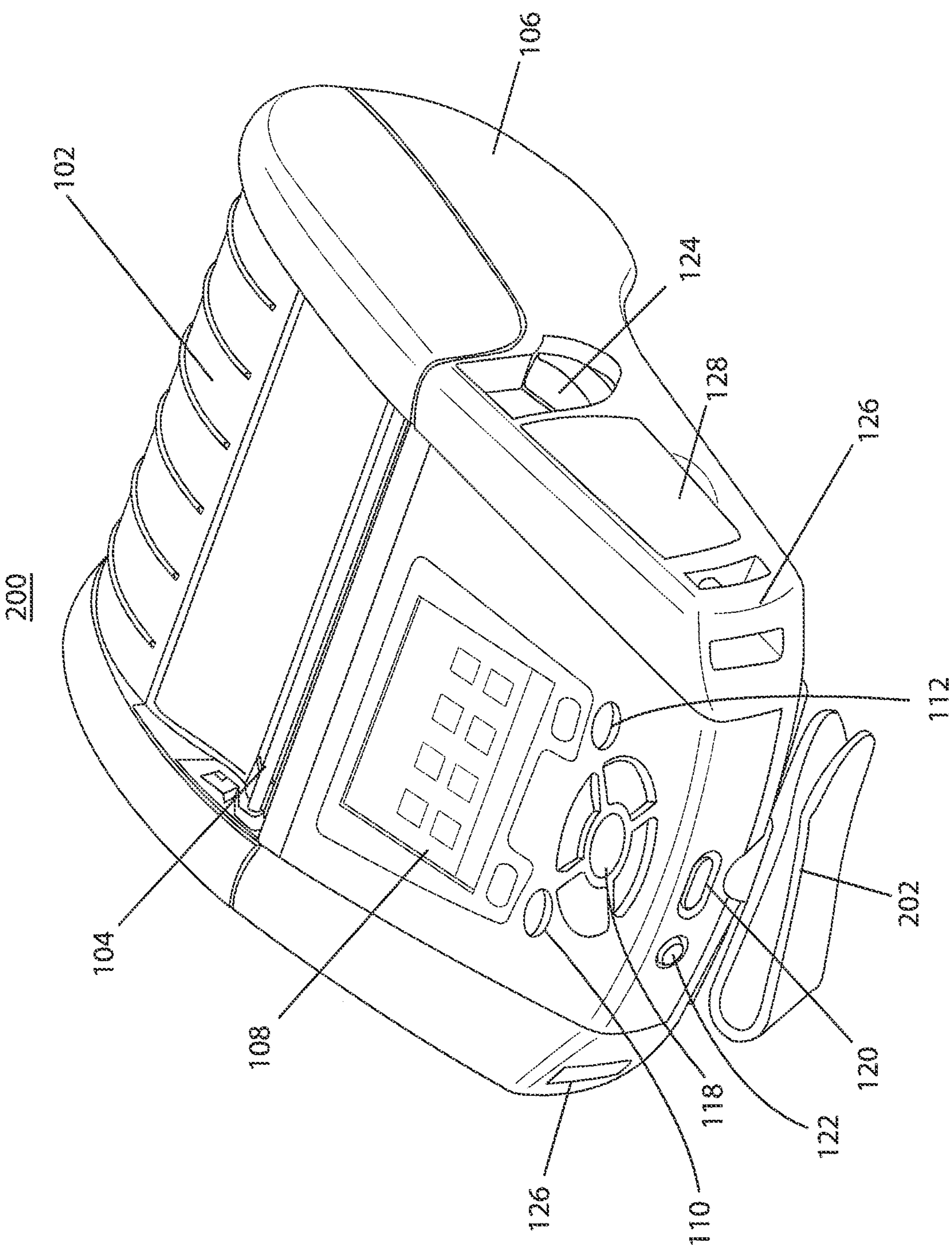
FIG. 2 shows an isometric view of a mobile printer in accordance with some embodiments discussed herein.

FIG. 2 shows printer 200, which includes components similar to or the same as those discussed above in connection with mobile printer 100. To avoid overcomplicating the discussion, like reference numbers refer to like elements throughout the drawings. (Although a display screen is not shown in FIG. 2, reference number 108 points to a portion of housing 106 that may be adapted to receive any type of display or other type of user interface.)

In some embodiments, the portion of printer 200's housing where display 108 may be integrated can be formed from one or more different materials than other portions of the housing. For example, the side walls of the housing (such as the portions where channels 126 are located) can be formed from an injection molded plastic, and the portion for display 108 can comprise die cut rubber. When manufacturing printer 200, for example, plastic for the housing can be injected molded around the die cut rubber, which may allow the same injection mold to be used for printers that have different sized and/or types of input components (e.g., different types of display screens, navigation button arrangements, etc.). In some embodiments, a rubber and/or other type of overmold can be applied to one or more of the printer's side walls and/or other components. Allowing the same molds to be used for multiple products can reduce manufacturing and machining costs sometimes associated with providing various product options to customers. In other embodiments, rather than place display 108 into rubber, the portion of the printer's housing that receives display 108 can be plastic and/or any other type of material. Other design aspects, some of which are discussed in commonly-assigned U.S. patent application Ser. No. 13/085,438, titled "PRINTER MOBILITY AND SCALABILITY," which was incorporated herein in its entirety by reference, may be included in some of the embodiments discussed herein and allow printer components to be used across various types of mobile printers, desktop printers and other devices in accordance with some embodiments of the present invention.

Printer 200 includes clip 202, which may enable printer 200 to be attached to a user's belt or belt loop. In some embodiments, clip 202 may swivel on a ball hinge or may remain in a fixed position relative printer 200. Housing 106 of printer 200 can be molded or otherwise adapted to receive clip 202 with or without another component. Some embodiments of housing 106, such as that shown in FIG. 2 that lacks a seam line running through the ball joint receptacle, can directly receive clip 202 without sacrificing much, if any, strength of the connection, even absent another component. Clip 202 can be removable and/or replaced with one or more other types of attaching components. For example, a magnetic attaching component could be located where clip 202 is shown in FIG. 2, and used to attach printer 200 to a metallic surface. Additional examples of belt clips that may be used in combination with some embodiments discussed herein are provided in commonly-assigned U.S. patent application Ser. No. 13/085,438, titled "PRINTER MOBILITY AND SCALABILITY," which was incorporated herein in its entirety by reference.

Figure 3:
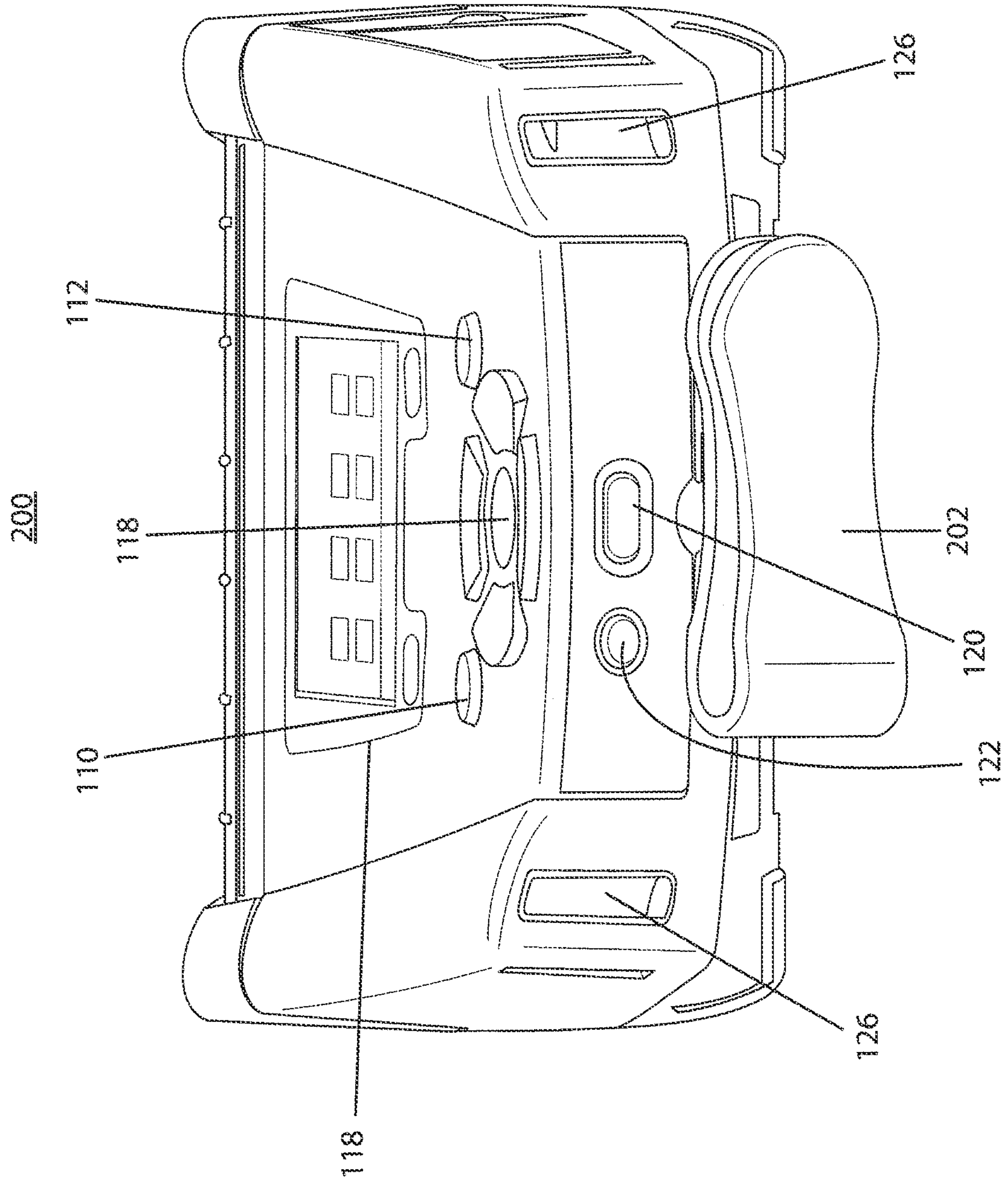
FIG. 3 shows a front view of the mobile printer discussed in connection with FIG. 2.

FIGS. 3-8D show different views of printer 200. For example, FIG. 3 shows a front view of printer 200.

Figure 4:
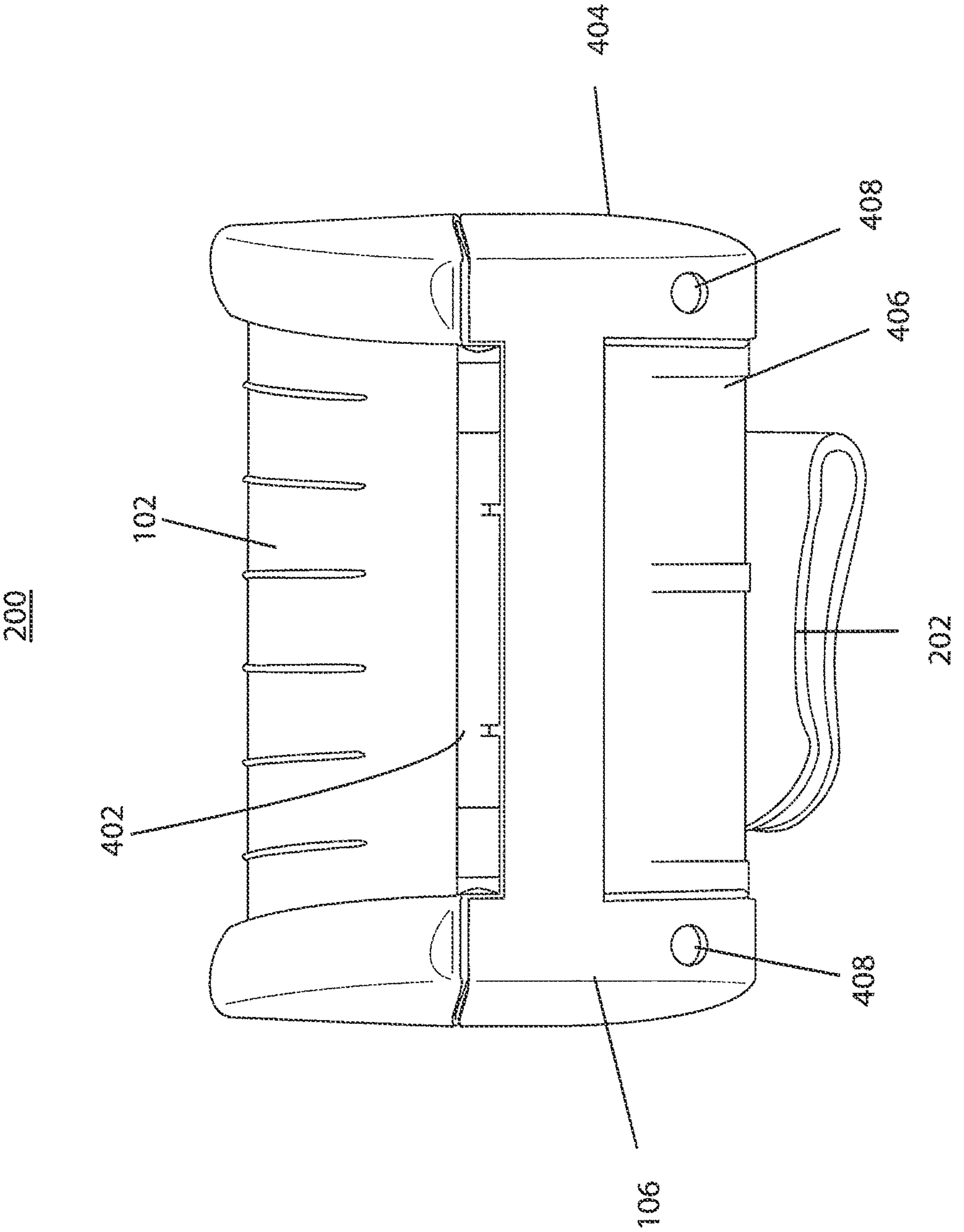
FIG. 4 shows a back view of the mobile printer discussed in connection with FIG. 2.

FIG. 4 shows a back view of printer 200. Hinge 402 can include a spring or other mechanism that allows media cover 102 to be driven open in response to a latch being released. For example, cover release actuator 124 can be adapted to release such a latch when depressed by a user. When media cover 102 is open, media can be loaded into printer 200, media jams can be corrected, print ribbon or other consumable printing components can be replaced, among other things. Cover release actuator 124 can also be configured to release a peel bar from a non-peeling position. Cover release actuator 124 can also be configured to release and/or drive a peel bar from a non-peeling position to a ready and/or peeling position. Additional examples of peel bars' functionality, including a examples of the non-peeling, ready and peeling positions, are discussed in connection with, e.g., FIGS. 9A-10R.

In other embodiments, the peel bar can function independent from cover release actuator 124. For example, cover release actuator 124 can be configured to open media cover 102 without causing the peel bar to be released from the latched position.

In some embodiments, cover release actuator 124 may be configured to function differently depending on how it is utilized (e.g., depressed). For example, when cover release actuator 124 is depressed partially, media cover 102 may be opened, and when cover release actuator 124 is depressed further (e.g., all or most of the way down), the peel bar is also released to a ready and/or peeling position.

The back view of printer 200 also shows that its housing was assembled from two pieces, namely, defining portion 404 and base portion 406. Defining portion 404 meets base portion 406 underneath printer 200 (as opposed to along the lateral sides such as housing 106 of mobile printer 100). Additional examples of printer housings and advantageous realized therefrom are provided in commonly-assigned U.S. patent application Ser. No. 13/085,431, titled "MOBILE PRINTER NETWORKING AND INTERFACING," which was incorporated herein in its entirety by reference.

Hinge 402 can attach media cover 102 to defining portion 404, and fasteners 408 (which may be screws and/or any other type of mechanical fasteners) can attach defining portion 404 to base portion 406. In some embodiments, the circuit board(s) of mobile printer 100 can be removed from (e.g., slid out of) housing 106 after base portion 406 is separated from defining portion 404. Each portion or sub-portion(s) of printer 200's housing can be constructed from any type of material, and may have a varying degree of transparency or opaqueness. For example, media cover 102 can be transparent, while the rest of the housing can be opaque.

Figure 5:
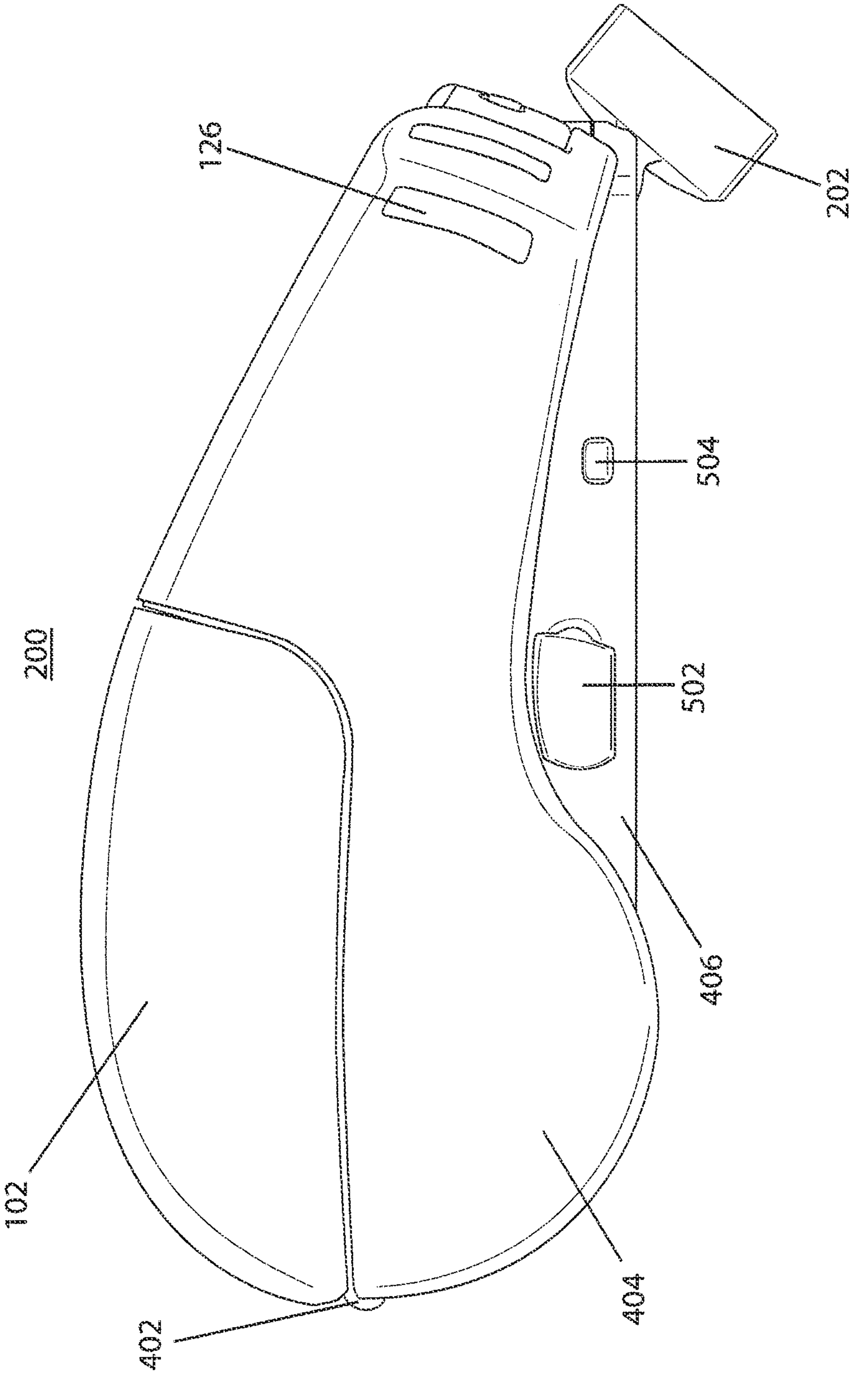
FIG. 5 shows a left side view of the mobile printer discussed in connection with FIG. 2.

FIG. 5 shows a left side view of printer 200, which includes protective cover 502 and alignment cavity 504. Similar to or the same as protective cover 128, protective cover 502 may be removed to expose one or more input, output, and/or input/output components that enable a power source, peripheral device, accessory device, network device, and/or other apparatus to be coupled with the circuitry of printer 200. In some embodiments, printer 200 can be configured to accept and/or work with accessories common to other types or models of devices. For example, a battery charger may be coupled to a port behind protective cover 502 and used to charge the battery pack of printer 200.

Alignment cavity 504 can be used to facilitate the proper electro-mechanical coupling of printer 200 with one or more accessory devices. For example, a docking station (sometimes referred to more generally herein as a "dock"), charging station, or mobile palette may define a protrusion that corresponds with and fits into cavity 504. As referred to herein, a "charging station," refers to an apparatus that can function as a source of power for charging the batteries of the mobile printer without facilitating data communications between the mobile printer and a network device. A "docking station," as used herein, refers to an apparatus that can receive and electrically couple with a printer, function as a source of power to charge the printer's batteries, and facilitate data communications between the printer and a host device (e.g., provide Ethernet communications to a network server). A docking station may be associated with a fixed physical location that is known to the host device and can be used to determine the location of printer 200. Exemplary docking stations are provided in commonly-assigned U.S. patent application Ser. No. 13/085,431, titled "MOBILE PRINTER NETWORKING AND INTERFACING," which was incorporated herein in its entirety by reference.

FIGS. 6A and 6B show two right side views of printer 200, which include cavity 602. Cavity 602 may be a detent adapted to receive a coupling mechanism, and may be the same as or similar to cavity 504 in design, functionality and/or application. In other embodiments (not shown), cavity 602 can take a different shape and/or form to cause printer 200 to be aligned in a particular manner relative to, e.g., a docking station or other apparatus. In some embodiments, cavities 504, 602 may operate to mechanically align printer 200 in a desirable presentation manner when printer 200 is docked onto a docking station or the like. By being properly aligned and coupled with a docking station, for example, the location of printer 200 may be determined based on the docking station's known location. In some embodiments, such as those in accordance with FIG. 6B and are provided in commonly-assigned U.S. patent application Ser. No. 13/085,438, titled "PRINTER MOBILITY AND SCALABILITY," which was incorporated herein in its entirety by reference, one or more notches may also be included in base portion 604.

Peeler Assembly

Embodiments of the present invention may include a mechanism by which media disposed on a backing is separated from the backing, or peeled, as the backing is advanced after printing. The peeling of media from a backing may be achieved by directing the backing along a tortured path including at least one relatively sharp bend. As the backing passes around this bend, the media, which is releasably adhered to the backing, may not follow the sharp bend of the backing, but instead be separated from the backing in a peeling action. Example embodiments are described herein which include a peeling assembly which is engaged (i.e., moved to the peeling position) in response to a media cover being closed, and an embodiment in which the peeling assembly may only be engaged when the media cover is in the closed position. While embodiments described herein are capable of peeling media from a backing, each embodiment may also be used with the peeler assembly in a non-peeling position, in which a continuous media strip may be printed, and the media may be torn from the strip of media as necessary.

FIG. 7 shows a top view of printer 200, which includes tear bar 702 that is visible through media slot 104. Tear bar 702 can be used to tear off or otherwise remove media from a roll or, more generally, from printer 200 after printing/encoding. Peeler assembly 704, shown in the disengaged, non-peeling position in FIG. 7, can also be incorporated in printer 200. Peeler assembly 704 may be a component of a threadless peeler assembly in accordance with some embodiments discussed herein.

As noted above, print media, such as adhesive labels or tags, may be disposed on a carrier substrate also known as a backing. Such media may be printed by a portable printer on an as-needed basis such that upon printing of the label or tag, the label or tag is then adhered to a surface. Embodiments may include printers configured to print shipping labels, identification tags, product information, etc. As such, when printing such media, particularly when printing them on an as-needed basis, it may be desirable to have the media separated from the backing automatically rather than requiring a user to individually peel each label or tag from the backing after printing. Thus, example embodiments provided herein may automatically separate the media from the backing during the printing operation. Embodiments may include a peeler assembly, as detailed below, to separate the media from the backing. As the media disposed on the backing is advanced past the printing mechanism, the peel bar of peeler assemblies may engage the media and separate the media from the backing. Although embodiments here are shown with a portable printer, similar peeling mechanisms and methods may be used with printer applicators, industrial printers, automatic label applicators, and similar devices which may not be portable.

FIG. 8A shows an isometric, rear perspective view of printer 200 having media cover 102 in an open position and peeler assembly 704 in an "up" position. Peeler assembly 704 can be stowed in a "down," non-peeling position and subsequently unlatched into the up position in response to an intuitive, peeler assembly actuator 802 being manually depressed by a user. When the user is loading linerless media (namely media that is not peeled from a liner or backing after printing, such as a sheet or roll of paper) into printer 200, peeler assembly 704 can remain latched in a stowed, non-peeling position (as opposed to, e.g., being automatically released in response to media cover 102 being opened). As a result, some embodiments of peeler assembly 704 can realize a number of advantages when implemented in a mobile printer. For example, peeler assembly 704 can be relatively smaller and provide easier loading of the media into printer 200 as compared to other types of peelers. In other embodiments, rather than include peeler assembly actuator 802, peeler assembly 704 may be unlatched or otherwise released in response to, e.g., media cover 102 being opened.

FIG. 8A also shows spindle-less holders 804, which are adapted to receive media roll 806, as shown in FIG. 8B. FIG. 8A also shows universal printhead 806. Universal printhead 806 is discussed further in connection with, e.g., FIGS. 148A-14C. FIG. 8B also shows peeler assembly 704 as including locking protrusions 808, which may be used to mate with a latching mechanism to lock peeler assembly 704 in the disengaged, non-peeling position (see, e.g., FIG. 8A) and/or in the peeling position (see, e.g., FIG. 8C). For example, locking protrusions 808 can be configured to be engaged by a media cover being shut when the peel bar is in the up or "ready" position as shown in FIG. 8B. As referred to herein, the "ready" position is between the peeling position and the non-peeling position, such that peeler assembly 704 is ready to engage media units to be peeled from a backing.

Figure 8C:
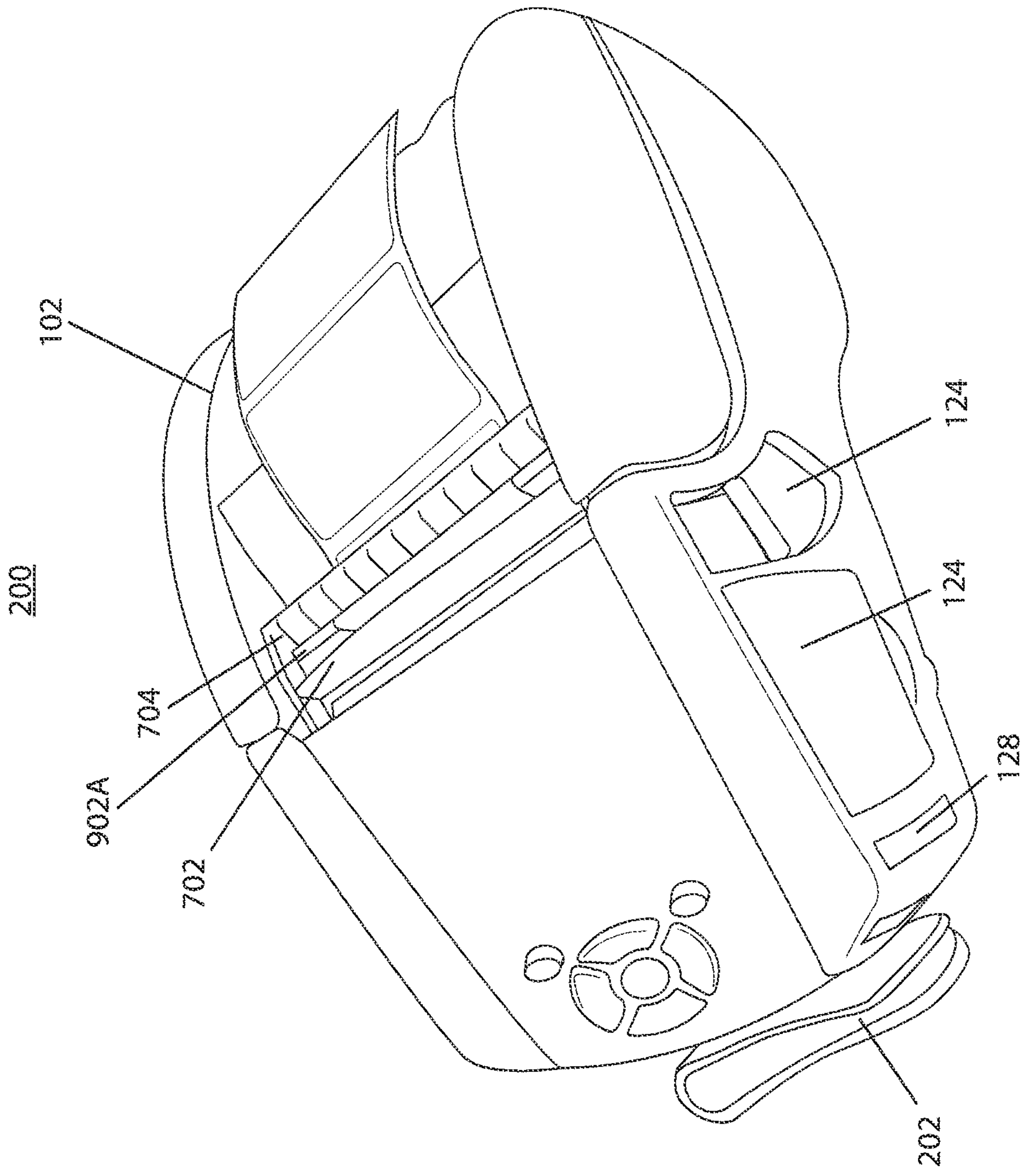

Peeler assembly 704 can include gears and other mechanical and/or electrical components that are adapted to automatically engage peeler assembly 704 onto the media as shown in FIG. 8C. For example, peeler assembly 704 can automatically engage the media in response to media cover 102 being closed while peeler assembly 704 is unlatched. Media cover 102 can be closed either manually and/or electromechanically after the media is loaded into printer 200. As media cover 102 is closed, peeler assembly 704 can automatically engage the media that has been partially extended between media cover 102 and peeler assembly 704. As such, peeler assembly 704 is configured to be a threadless peeler, which does not require a label to be partially separated from its backing to enable peeling of subsequent labels. Rather, the peeler assembly may be configured to peel labels after being placed onto a label's printable surface.

Figure 8D:
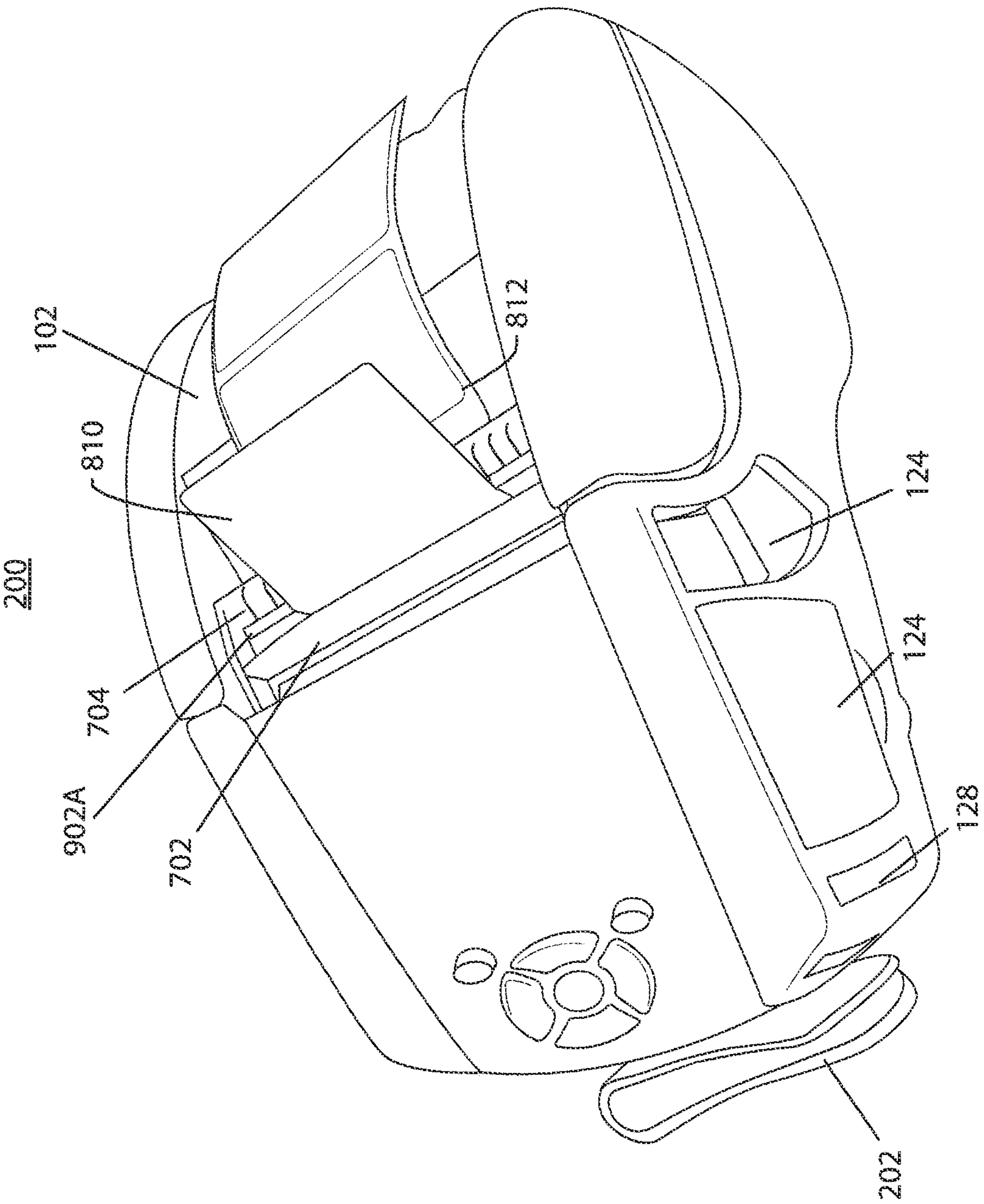

For example, media cover 102 can be opened, peeler assembly 704 can be released into an up or other type of ready position as shown in FIG. 8B, media roll 806 can be loaded into spindle-less holders 804, media cover 102 can be at least partially closed, a portion of media roll 806 can be at least partially extended between media cover 102 and peeler assembly 704, and the printing of the labels can cause peeler assembly 704 to peel the labels from their backing. In some embodiments, the peeler assembly can include gears and/or any other mechanism (such as those discussed in connection with FIGS. 9A-10C and/or 10D-10H) that enables peeler assembly 704 to be configured to come down and automatically engage media roll 806, thereby pressing the media against media cover 102, in response to media cover 102 being closed and/or latched into a closed position. When the media is pressed against the media cover 102, the media is routed around peel bar 902A creating a relative sharp bend to cause the peeling to occur as will be discussed further below. Peeler assembly 704 can then separate subsequent media units (e.g., labels) from the media's backing as printer 200 prints. FIG. 8D shows how peeler assembly 704 may separate media unit 810 from backing portion 812. The path of the media 812 and the resulting peeling will be further detailed below with respect to FIGS. 10S and 10T.

By being configured to threadlessly peel media units from their backing, peeler assembly 704 can be made smaller than other peeler assemblies, since other peeler assemblies designed for manual-use often require user engageable features, such as wings adapted for a user to handle. As such, peeler assembly 704 and other threadless peeler assemblies, some additional examples of which are discussed herein, can lack one or more user engageable features often included in manually engageable peeler assemblies, such as relatively wider or, more generally, larger peel bars than that shown in connection with peeler assembly 704.

FIGS. 9A and 9B show example peeler assembly 900, which is another example of a threadless peeler in accordance with some embodiments discussed herein. Peeler assembly 900 includes peel bar 902, idler bar 902A, support members 904, curved slots 906, actuating shaft 908, springs 910 and gear 912.

Components of a printing assembly are also shown in FIG. 9A. For example,

FIG. 9A shows roller 914 and printhead 916. Printhead 916 may be, for example, a universal printhead, such as that discussed in connection with FIGS. 14A and 14B.

FIG. 9A also shows how the printing assembly and peeler assembly 900 can be mounted to the same chassis, namely chassis 918. Chassis 918, like other components discussed herein, can be made from any suitable material(s), such as one or more metals, carbon fibers, plastics, rubbers, silicon wafers, among other things. In some embodiments, chassis 918 can also be configured to house and/or protect one or more electrical components, such as a motor, circuitry on a circuit board, among other things.

FIG. 9B shows peeler assembly 900 without the printing components and chassis 918. Peel bar 902 can be connected to one or more support members 904A and 904B to form a U-shape as shown in FIG. 9B. In some embodiments, rather than comprise a number of pieces that are connected together, peel bar 902 and one or more of support members 904A and 904B can be the same component (e.g., molded or otherwise formed as a single piece of metal). For example, peel bar 902 can be connected to support member 904A using a hole included in 904A and a protrusion included at the end of peel bar 902, and/or peel bar 902 can be the same component as support member 904B (e.g., a piece of curved metal).

Peel bar 902 can also include curved surface 920 and flat surface 922 separated by edge 924. Curved surface 920 may be shaped as shown to avoid any sharp and/or pointed edges as well as for aesthetic purposes. Although not shown in FIG. 9B, one or more rollers, grooves, and/or other features may be included in peel bar 902 (on the side opposite of curved surface 920) to facilitate peeling a media unit from its backing, while still allowing the media unit to be easily removed from the peel bar and/or while enabling the printer's drive motor to operate more efficiently (than if, e.g., peel bar 902 does not include such features).

Support members 904A and 904B are shown in FIG. 9B as including curved slots 906 through which protrusions 926 of actuating shaft 908 are configured to engage. Protrusions 926 can be located at the distal ends of actuating shaft 908 and be configured to move within curved slots 906. In some embodiments, peeler assembly 900 may include one or more than two support members. Also, in some embodiments, one or more of the support members may not be configured to engage actuating shaft 908, or engage actuating shaft 908 in differing manners.

One or more springs 910 may be connected to one or more of support members 904A and 904B, and the respective protrusion 926. Springs 910 can be configured to cause peel bar 902 to be securely stowed when in a non-peeling position and/or be configured to supply a peeling force when peel bar 902 is in the peeling position. In some embodiments, the printer's media cover and/or other component(s) (such as, e.g., a locking component) can be used to securely stow peel bar 902 in either the non-peeling position or the peeling position, or possibly securely stow the peel bar 902 in both the non-peeling position and the peeling position. Using the springs 910 to securely stow the peel bar in both the peeling and non-peeling positions can be accomplished by virtue of the spring being relatively un-extended when the peel bar is in the peeling position and the non-peeling position, and be extended while transitioning between the peeling position and the non-peeling position. Such a configuration would drive the peel bar to the peeling position or the non-peeling position, but not in between.

Peeler assembly 900 may also include one or more gears, such as gear 912, connected to actuating shaft 908. Gear 912 may engage actuating shaft 908 (e.g., using one or more teeth or by any other suitable mechanism). As discussed in connection with FIGS. 10A-10C, rotating gear 912 may guide peel bar 902 from a non-peeling position (or ready position) to a peeling position (or vice-versa). In some embodiments, gear 912 may be connected to or included in a motor (not shown) configured to drive peel bar to engage/disengage media units being printed. As such, gear 912 and actuating shaft 908 can be configured to move in response to a force exerted by a motor. Gear 912 can also be configured to lock peel bar 902 in a peeling position, ready and/or non-peeling position(s). As another example, peel bar 902, gear 912 and actuating shaft 908 can be configured to move in response to a force exerted by a user (such as, e.g., a user's finger(s)).

One or more additional components not shown in the drawings may be included in peeler assembly 900. For example, one or more springs may be attached to (e.g., wound around) a portion of actuating shaft 908 between the support members 904A and 904B (e.g., as opposed to springs 910 which are shown as being attached to the defining portion of support members 904A and 904B). Such spring may be configured to cause peel bar 902 to assume a ready position (e.g., in response to cover release actuator 124 being depressed) and/or may exert a greater force than springs 910 (e.g., thereby causing springs 910 to be at least partially elongated while in the ready position).

FIGS. 10A-10C show an example of how peeler assembly 900 can move peel bar 902 from a non-peeling position to a ready position (or vice-versa) and from the ready position to a peeling position (or vice-versa). FIG. 10A shows peel bar 902 in an example non-peeling position, such as that shown in FIG. 7. FIG. 10B shows peel bar 902 in an example ready position, such as that also shown in FIGS. 8A and 8B. FIG. 10C shows peel bar 902 in an example peeling position, such as that also shown in FIGS. 8C and 8D.

As noted above, peel bar 902, gear 912 and actuating shaft 908 can be configured to move in response to, for example, a force exerted by a user onto peel bar 902 and/or a force exerted by an electric motor. While in the non-peeling position, peel bar 902 may be stowed as shown in FIG. 7. In some embodiments, peel bar 902 may be removed from the non-peeling position to the ready position of FIG. 10B by a user's finger (e.g., manually lifting the peel bar). In some embodiments, peel bar 902 can move from the non-peeling position of FIG. 10A to the ready position of FIG. 10B in response to detecting a depression of a manual release actuator (such as cover release actuator 124) that unlatches a latch locking peel bar 902 in the non-peeling position and allows a spring to drive peel bar 902 to the ready position of FIG. 10B. As yet another example, peel bar 902 may move from the non-peeling position to the ready position in response to a button (such as media cover release actuator 124 or any other button) being pushed that actuates a motor.

FIG. 10B also shows motion arrows 1002, 1004 and 1006. Gear 912 may be configured to move in the direction of motion arrow 1002 when peel bar 902 is moved in the direction of motion arrow 1004 from a non-peeling position to a ready position and/or from a ready position to a peeling position. While gear 912 and peel bar 902 are respectively moving in the direction of motion arrows 1002 and 1004, actuating shaft 908 may move in the direction of motion arrow 1006. The curved shape of slot 906 can assist in guiding peel bar 902 in the direction of motion arrow 1004.

As shown in FIG. 10C, a mechanism, such as spring 910 can assist in and/or independently cause the locking of peel bar 902 in the peeling position Similar, as shown in FIG. 10A, a mechanism, such as spring 910 can assist in and/or independently cause the locking of peel bar 902 in the non-peeling position.

In some embodiments, peel bar 902 can be constrained in the non-peeling position, ready position and/or peeling position by one or more other components of the printer. For example, a media cover (and/or peel bar 902) may be configured to lock the peel bar in the peeling and/or non-peeling position when the media cover is closed. Similarly, in some embodiments, moving of one or more other components of the printer can cause and/or enable peel bar 902 to move among the positions shown in FIGS. 10A-10C. For example, gear 912 may be configured to automatically engage the peel bar with the print media in response to the media cover being closed while peel bar 902 is in the ready position of FIG. 10B. One or more gears, such as gear 912, can also be configured to lock the peel bar in a peeling position, such as that shown in FIG. 10C.

FIGS. 10D and 10E show example peeler assembly 1010, which is another example of a threadless peeler in accordance with some embodiments discussed herein. Peeler assembly 1010 may include one or more components that are the same as or similar to those included in peeler assembly 900. Like reference numbers are used to refer to like components. For example, peeler assembly 1010 includes peel bar 902, support members 904A and 904B, curved slots 906, actuating shaft 908, springs 910, roller 914, printhead 916 and protrusions 926, which may be the same or similar as that discussed above.

FIG. 10D also shows how the printing assembly and peeler assembly 1010 can be mounted to the same chassis, namely chassis 918. Chassis 918, like other components discussed herein, can be made from any suitable material(s), such as one or more metals, carbon fibers, plastics, rubbers, silicon wafers, among other things. In some embodiments, chassis 918 can also be configured to house and/or protect one or more electrical components, such as a motor, circuitry on a circuit board, among other things.

FIG. 10E shows peeler assembly 1010 without the printing components and chassis 918. Support members 904A and 904B are shown in FIG. 10E as including curved slots 906 through which protrusions 926 of actuating shaft 908 are configured to engage. Protrusions 926 can be located at the distal ends of actuating shaft 908 and be configured to move within curved slots 906. Actuating shaft 908 can have a rectangular cross-section (as shown in FIG. 10E), a circular cross-section (as shown in FIG. 9B) and/or any other suitable shape. Actuating shaft 908 can also include one or more internal gears 1012 located between support members 904A and 904B and/or outside of chassis 918. In some embodiments, peeler assembly 1010 may include one or more than two support members. Also, in some embodiments, one or more of the support members 904A and 904B may not be configured to engage actuating shaft 908, or engage actuating shaft 908 in differing manners.

Peeler assembly 900 may also include one or more gears, such as gear 1014, connected to internal gears 1012. Gear 1014 may engage internal gears 1012 and actuating shaft 908 (e.g., using one or more teeth, or a belt, or by any other suitable mechanism). As discussed in connection with FIGS. 10E-10H, gear 1014 may guide peel bar 902 from a non-peeling position (or ready position) to a peeling position (or vice-versa). In some embodiments, gear 1014 and/or one or more of internal gears 1012 may be connected to slide bar 1016. Slide bar 1016 may also include handle 1018 configured to drive peel bar 902 to engage/disengage media units being printed in response to, e.g., a user's finger applying pressure in one or more directions. As such, gear 1014, internal gears 1012 and/or actuating shaft 908 can be configured to move in response to a force exerted by a user and/or anything else that is able to exert a force onto handle 1018.

One or more additional components not shown in the drawings may be included in peeler assembly 1010. For example, one or more springs may be attached to (e.g., wound around) a portion of actuating shaft 908 between the support members 904A and 904B (e.g., as opposed to springs 910 which are shown as being attached to the defining portion of support members 904A and 904B). Such spring may be configured to cause peel bar 902 to assume a ready position (e.g., in response to cover release actuator 124 being depressed) and/or may exert a greater force than springs 910 (e.g., thereby causing springs 910 to be at least partially elongated while in the ready position).

FIGS. 10F-10H show an example of how peeler assembly 1010 can move peel bar 902 from a non-peeling position to a ready position (or vice-versa) and from the ready position to a peeling position (or vice-versa). FIG. 10F shows peel bar 902 of peeler assembly 1010 in an example non-peeling position, such as that shown in FIG. 7. FIG. 10G shows peel bar 902 of peeler assembly 1010 in an example ready position, such as that also shown in FIGS. 8A and 8B. FIG. 10C shows peel bar 902 of peeling assembly 1010 in an example peeling position, such as that also shown in FIGS. 8C and 8D. While some example embodiments described herein provide for a peel bar that may be disposed in a non-peeling, ready, and peeling position, other embodiments may provide only for the peel bar to be in either a peeling or non-peeling position, where the peel bar is moved between the two positions. In such an embodiment, the "ready" position of illustrated embodiments, such as FIG. 10G, may only be a position of the peel bar as it is moved between the non-peeling and peeling positions.

As noted above, peel bar 902, gear 1014 and actuating shaft 908 can be configured to move in response to, for example, a force exerted by a user's finger onto handle 1018. While in the non-peeling position, peel bar 902 may be stowed as shown in FIG. 10F. In some embodiments, peel bar 902 may be removed from the non-peeling position to the ready position of FIG. 10G by a user's finger (e.g., pushing handle 1018 in the direction of motion arrow 1020).

FIG. 10G also shows motion arrows 1022 and 1024. Gear 1014 may be configured to move in the direction of motion arrow 1022 when peel bar 902 is moved in the direction of motion arrow 1024 from a non-peeling position to a ready position and/or from a ready position to a peeling position. While gear 1014 and peel bar 902 are respectively moving in the direction of motion arrows 1022 and 1024, slide bar 1016 may move in the direction of motion arrow 1018. The curved shape of slot 906 can assist in guiding peel bar 902 in the direction of motion arrow 1024.

As shown in FIG. 10H, a mechanism, such as spring 910 can assist in and/or independently cause the locking of peel bar 902 in the peeling position Similar, as shown in FIG. 10A, a mechanism, such as spring 910 can assist in and/or independently cause the locking of peel bar 902 in the non-peeling position.

FIGS. 10I-10L show example peeler assembly 1030, which is another example of a threadless peeler in accordance with some embodiments discussed herein. Peeler assembly 1030 may include one or more components mounted to a printer's frame, such as chassis 918, and a specially designed media cover 102.

For example, media cover 102 of peeler assembly 1030 may include cam slot 1032 and idler bar 1034. Media cover 102 may also include hole 1036 (which need not be a hole and may be a detent, recess and/or any other suitable means) for receiving spring loaded plunger 1038. Spring loaded plunger 1038 may be included and/or otherwise attached to chassis 918, the printer's housing and/or any other component of the printer. Spring loaded plunger 1038 may be retracted from hole 1036 in response to, for example, cover release actuator 124 being depressed and/or in response to any other type of user interaction and/or automated control signal being generated and/or received by the printer.

Peeler assembly 1030 may also include peeler bar 1040, torsion bar 1042, and latch 1044. Peeler 1040 may function and/or otherwise be the same as or similar to peel bar 902 discussed above. For example, peeler 1040 may include rollers on its peeling surface as described herein. Peeler 1040 or torsion bar 1042 may also be linked via, e.g., protrusion 1046 and a slot included in one or more support members of peeler 1040.

Latch 1044 may include spring 1048, which may be configured to store enough potential energy to cause latch 1044 to stay engaged with torsion bar 1042, despite the force applied to torsion bar 1042 by spring 1050. Spring 1048 may also be configured to enable a user to depress latch 1044 to release peeler 1040.

For example, as shown in FIG. 10J, while media cover 102 is open a user may apply a force in the direction of motion arrow 1056, which will cause latch 1044 to disengage torsion bar 1042. Upon being disengaged, spring 1050 can cause torsion bar to rotate in the direction of motion arrow 1058. The portion of torsion bar 1042 that was engaged with latch 1044 can then move in the direction of motion arrow 1060 as guided by protrusion 1046 in slot 1052 of the support member of peeler 1040. As a result, peeler 1040 may move in the direction of motion arrow 1062 and enter a ready position. Upon media cover 102 being closed in the direction of motion arrow 1064, one or more cams 1054 (only one is shown in the view of the drawings) can be engaged by one or more cam slots 1032 (only one can be seen in the drawings) and peeler 1040 can be locked into a peeling position. In some embodiments, a user may have to extend a media unit on a backing into space 1066, which is located between peeler 1040 and media cover 102, before closing media cover 102.

Also shown in FIG. 10I is circuitry 1068, which may be configured to execute some or all of the printer's functionality, some examples of which are discussed herein in connection with, e.g., FIG. 11B.

FIG. 10K shows peeler 1040 in a peeling position. As a media unit on a backing moves over idler bar 1034 and under peeler 1040, the media unit can be peeled from the backing and can stick to or otherwise be removed from defining portion of peeler 1040 that is visible in FIG. 10K. The peeling process is further described with respect to FIGS. 10S and 10T below.

FIG. 10L shows a left side view of peeler assembly 1030 in a stowed position (as compared to the right side view of peeler assembly 1030 in the stowed position shown in FIG. 10I). From the view shown in FIG. 10L, switch 1070 is visible. Switch 1070 can be configured to detect if peeler assembly 1030 is in the stowed position of FIGS. 10I and 10L, or in the peeling position of FIG. 10K and/or the ready position of FIG. 10J. Switch 1070 can be any suitable component, such as one or more of a pressure sensitive switch, optical switch, any other type of proximity switch, etc. In some embodiments, a sensor could determine the status of the switch and communicate that to the processor which would then determine the position of the peeler. In another embodiment, a user could use a key or the touch screen to indicate the desire to turn peel on or off, and the printer could then move the peel bar from one position to another. The position of the peeler may impact printer settings such that a sensor to detect the position of the peel bar may cause the printer settings to be adjusted to correspond with the peel bar position as described further below.

FIG. 10M illustrates another example embodiment of a peeler assembly 1500 according to an example embodiment of the present invention. The illustrated peeler assembly 1500 includes peel bar 902 and peel bar support member 904. The peel bar 902 is attached to the peel bar support member 904, and the peel bar support is coupled to the chassis at pivot point 1505. The peeler assembly 1500 of FIG. 10M includes an actuating shaft 908 extending through the chassis 918, and coupled to support members 904 on either side of the chassis 918 by protrusions 926 within curved slots 906. While the illustrated side view of the peeler assembly 1500 including the support members 904, pivot points 1505, actuating shaft 908, protrusions 926, and curved slots 906 are substantially mirrored on the opposite side of the chassis 918, the mechanism by which the peel bar 902 is actuated from a peeling position to a stowed, non-peeling position may be disposed only on one side of the chassis 918.

The mechanism for actuating the peel bar 902 of the peeler assembly 1500 from the illustrated stowed, non-peeling position of FIG. 10M includes a pinion gear 1510, a peeler assembly actuator 1515, a rack 1520 attached to the peeler assembly actuator 1515 which engages the pinion gear 1510, and a slot 1525 in the chassis 918 in which the peeler assembly actuator 1515 is configured to travel. The peel bar 902 is illustrated disposed in the stowed, non-peeling position while the peeler assembly actuator 1515 is disposed in the disengaged position at the bottom of its travel. In response to the peeler assembly actuator being pressed or actuated in the direction of arrow 1530, the peeler assembly actuator 1515 moves along slot 1525 (to which it is engaged by, for example, fastener 1535) toward an engaged position. As the peeler assembly actuator 1515 advances along the direction of arrow 1530, the rack 1520 moves relative to pinion gear 1510 and rotates pinion gear 1510 in a clockwise direction. As pinion gear 1510 rotates in a clockwise direction, the actuating shaft 908, which is engaged with the pinion gear 1510 by a mating gear (not shown) is rotated in a counter-clockwise direction. Rotation of the actuating shaft 908 in the counter-clockwise direction moves protrusion 926 within curved slot 906 and pivots the peel support member 904 about pivot point 1505. The peel bar 902 rotates in a clockwise direction around the pivot point from the stowed, non-peeling position of FIG. 10M, to the deployed, peeling position of FIG. 10N.

Example embodiments may include a spring member 1540 which biases the peeler assembly actuator 1515 in the direction of arrow 1545, toward the disengaged position, thereby biasing the peeler assembly 1500 in the stowed, non-peeling position of FIG. 10M. However, the peeler assembly 1500 may be retained in the deployed, peeling position by springs, such as those shown (springs 910) in FIGS. 10F through 10H. A locking mechanism may also be employed to maintain the peeler assembly in the peeling position and/or the peeler assembly actuator in the engaged position, as will be detailed further below.

The movement of the peeler assembly 1500 of FIGS. 10M and 10N from the stowed, non-peeling position of FIG. 10M to the deployed, peeling position of FIG. 10N, and vice versa, may operate in generally the same manner as the peel bar 902 and assembly of FIGS. 10F-10H; however, the peeler assembly actuator 1515 and the attached rack 1520 are configured to move in a generally vertical direction (along arrow 1530 of FIG. 10M) as compared to a generally horizontal direction (along arrow 1020 of FIG. 10G). The peeler assembly of the embodiment of FIGS. 10M-10R may not engage or otherwise rely upon closure of a media cover to secure the peeler assembly in the peeling position, as described with respect to the embodiment of FIGS. 10I-10L.

FIG. 10P illustrates a side-view of a printer which may include a peeler assembly and associated actuation mechanism as illustrated in FIGS. 10M and 10N. In the illustrated embodiment, the printer 1600 includes a housing 1610, a media cover 1620, a media cover release actuator 1630, and peeler assembly actuator 1640. Both the peeler assembly actuator 1640 and the media cover release actuator 1630 are accessible when the media cover 1620 is in the closed position. The peeler assembly actuator 1640 further includes lock button 1670 as will be described further below. The peeler assembly of the illustrated embodiment is actuated from the stowed, non-peeling position to the deployed, peeling position by advancing the peeler assembly actuator 1640 in the direction of arrow 1645, from the illustrated disengaged position corresponding to a stowed, non-peeling position of the peeler assembly of FIG. 10P to an engaged position corresponding to a deployed, peeling position of the peeler assembly of FIG. 10Q. It may be desirable for the peeler assembly actuator 1640 to be accessible outside of the housing 1600 when the media cover 1620 is in the closed position such that previously loaded media may not require threading between the peel bar during the media loading process. Instead, the media may be guided on the proper path by a simple loading technique (not requiring threading of the media) and engagement of the peeler mechanism after the media cover is closed, as further described below.

The media cover release actuator 1630 may be depressed in a direction opposite to that of arrow 1645 of FIG. 10P in order to release and open the media cover 1620 for the loading or unloading of media. However, it may be undesirable to release and/or open the media cover 1620 while the peel bar 902 is in the deployed, peeling position. The media cover 1620 may not properly open or close with the peel bar in the peeling position. While described herein as a media cover release actuator to release the media cover from the closed position, embodiments of the media cover release actuator may also actuate a media cover open mechanism that drives the media cover to the open position by electromechanical means, spring biasing means, hydraulic/pneumatic means, gravity, etc. As such, the term "release" as used herein with reference to the media cover release actuator refers to transitioning the media cover from the closed position, at least in part, toward the open position.

As shown, in FIG. 10P, the media cover release actuator 1630 has clearance to be moved in a direction opposite to that of arrow 1645, with the clearance illustrated as 1655 in order to release and open the media cover 1620. As shown in FIG. 10Q, with the peeler assembly actuator 1640 in the engaged position corresponding to the deployed, peeling position of the peeler assembly, the media cover release actuator 1630 does not have sufficient clearance 1655 to be depressed. Therefore, with the peeler assembly actuator 1640 in the engaged position corresponding to the peeler assembly being in the deployed, peeling position, the media cover release actuator 1630 cannot release the media cover 1620 from the closed position. This feature prevents the media cover from being released from the closed position while the peeler assembly is in the peeling position, as opening of the media cover while the peel bar is in the peeling position can introduce error states, such as media jamming and interference between the media cover and the peel bar, precluding full travel of the media cover or closure of the media cover.

While printing with printers of example embodiments of the present invention, it may be undesirable for the peel bar to be accidentally or unintentionally moved from the peeling position to the non-peeling position. To that end, FIGS. 10P, 10Q, and 10R each illustrate a lock button 1670 configured to preclude movement of the peeler assembly actuator 1640 from the engaged position corresponding to the deployed, peeling position of the peel bar to the disengaged position corresponding to the stowed, non-peeling position of the peel bar.

As the spring 1540 of FIG. 10N biases the peeler assembly actuator 1640 to the disengaged position corresponding to the stowed, non-peeling position of the peel bar, it may be desirable to latch or lock the peeler assembly actuator 1640 in the raised, engaged position of FIG. 10Q. Inadvertent movement of the peel bar 902 from the peeling position (FIG. 10M) to the non-peeling position (FIG. 10N) during printing may cause the media to become jammed in the printer and may lead to printing errors. Therefore, a lock mechanism including lock button 1670 may be implemented to preclude inadvertent movement of the peeler assembly actuator 1640. When the peeler assembly actuator 1640 is in the engaged position of FIG. 10Q corresponding to peeling, a user may need to depress the lock button 1670 before moving the peeler assembly actuator 1640 to the disengaged, non-peeling position. Thus discouraging accidental movement of the actuator and preventing accidental bumping of the actuator 1640 to the disengaged position. When the peeler assembly actuator 1640 is in the engaged position illustrated in FIG. 10Q, the locking mechanism including the lock button 1670 is in the locked position such that the peeler assembly actuator 1640 cannot be accidentally "bumped" back to the disengaged position illustrated in FIG. 10P.

As outlined above, in some embodiments of a printer including a media cover 1620 and a peeler assembly, it may be detrimental to open the media cover 1620 while the peeler assembly is disposed in a deployed, peeling position. A corollary of this may be that it may also be detrimental for the peeler assembly to be moved from the stowed, non-peeling position to the deployed, peeling position while the media cover 1620 is in the open position. FIG. 10R illustrates the printer of FIGS. 10M and 10P with the media cover 1620 disposed in the open position and the peeler assembly actuator 1640 in the position corresponding to the stowed, non-peeling position of the peeler assembly.

In some example embodiments, the lock button 1670 may also be implemented to also prevent movement of the peeler assembly actuator from the disengaged, non-peeling position to the engaged, peeling position when the media cover 1620 is in the open position. When the media cover 1620 is in the closed position, as shown in FIGS. 10P and 10Q, the peeler assembly actuator 1640 may be moved along arrow 1645 of FIG. 10P upon pressing of lock button 1670. The depression of lock button 1670 may allow the peeler assembly actuator 1640 to be advanced along arrow 1645. However, when the media cover 1620 is in the open position, as illustrated in FIG. 10R, lock button 1670 may be precluded from being depressed by a lock mechanism and the peeler actuation actuator 1640 is precluded from moving from the disengaged position corresponding to the stowed, non-peeling position. This lock-out feature may prevent the peel bar from being deployed to the peeling position while the media cover 1620 is open, as when the peel bar is in the deployed position, the media cover may not be able to properly close. This lock-out feature may dissuade a user from attempting to close the media cover 1620 with the peel bar deployed.

As outlined above with regard to FIGS. 10P, 10Q, and 10R, example embodiments of the invention may be configured to preclude a user from improperly deploying the peeler assembly and improperly opening the media cover. Precluding a user from improper use of the printer may lead to fewer problems with the printer and increased user satisfaction.

An example embodiment demonstrating advantages of the peeler assembly actuator 1640 being positioned to be accessible outside of the housing may be described with respect to the loading of media into the printer. FIG. 10R illustrates a printer 1600 with the media cover 1620 in an open position. As outlined above, when the media cover is in the open position, it may be undesirable for the peeler assembly to be in the peeling position such that the peeling assembly of the illustrated embodiment of FIG. 10R may be in the non-peeling position. If the peeler was disposed in the peeling position, loading of the media would require threading of the media around an idler bar (described and illustrated below) and under the peeler bar. This threading operation can be cumbersome, particularly in a compact printer.

Upon loading a roll of media, for example including a roll labels disposed on a backing, the media cover 1620 may be closed. FIG. 10S illustrates a cross section of a portion of a printer similar to those embodiments illustrated in FIGS. 10A-10R in which a media roll 1680 is received within the printer. The illustrated embodiment includes the peel bar 902, the peel bar supports 904, the platen roller 907, the printhead 903, and the media roll 1680. The illustrated embodiment further includes a tear bar 1685. In the illustrated embodiment, the platen roller 907 may be attached to the media cover 1620. A strip of media (and media backing) may be separated from the roll as the media roll 1680 is loaded into the printer, and upon closing the media cover 1620, the platen roller 907 sandwiches the strip of media between the printhead 903 and the platen roller 907 at printing nip 903A. The path of the media is illustrated by arrow 901.

The illustrated embodiment of FIG. 10S depicts a strip of media extending from the media roll 1680 between the printhead 903 and the platen roller 907, and exiting the printer along the media path shown by arrow 901. Media that exits the printer in this manner may be configured for tearing at intervals to separate printed media from the strip of media. Tear bar 1685 may be a serrated or otherwise sharpened edge along which the media may be torn. When printing to media that is configured to be torn, or linerless media which does not require the printed substrate to be separated from a backing, the printed media may exit the printing nip 903A toward the tear bar 1685. With the media positioned against the tear bar 1685, tearing of the media is more precise.

FIG. 10T illustrates an example embodiment of the cross section of the printer as shown in FIG. 10S printing to media that is attached to a backing. The media roll 1680 may be received in the same manner as described with respect to FIG. 10S. However, after the media is loaded, the peel bar supports 904 may be pivoted as shown by arrow 1690 to move the peel bar 902 to the peeling position. When the peel bar is moved to the peeling position shown in FIG. 10T, the media may be folded around idler bar 902A and under peel bar 902. This positioning of the media does not require manual intervention other than to move the peel bar from the non-peeling position to the peeling position. Further, as noted above, the movement of the peel bar may be automated such that manual actuation isn't necessary. The strip of media is then disposed in the media backing feed path illustrated by arrow 905 in FIG. 10T. As the media is advanced during printing, the relatively sharp contours of the media backing feed path 905, particularly the sharp contour around the idler bar 902A as held by the peel bar 902, cause the media to be separated or peeled from the backing. The media advances along media path 909 while the backing advances along media backing path 905. Due to the sharp contour around idler bar 902A, the relatively high stiffness of the media, and the relatively low adhesive force between the media and the media backing, the media advances along media path 909 while the media backing advances along media backing path 905 without requiring manual peeling of the media from the backing.

The media path 909 of FIG. 10T exits the printing nip 903A in a direction different than that of the media path 901 of FIG. 10S. As such, the printing settings of may need to be adjusted in order to optimize print quality. Printing settings may be adjusted in response to the position of the peel bar in order to optimize printing. Printhead settings, such as printing temperature, printing speed, print character position, etc., may be adjusted based on the peel bar position to improve the printing quality while the speed of the printing and media feeding may also be adjusted to optimize print quality.

As described above with respect to FIG. 10L, a switch 1070 may be used to provide the printer software with an indication of the peeler position. The software of the printer may receive this signal and adjust the printer settings, such as the printhead settings, accordingly.

FIG. 11A shows printer 1100, which may include one or more components that are the same and/or similar to the other printers discussed herein. In some embodiments, one or more sensors, such as sensor 1102 of FIG. 11A, can be configured to detect whether peel bar 902 is in a peeling position. For example, sensor 1102 may be an optical, magnetic, pressure (e.g., depression) and/or proximity sensor that is able to detect when peel bar 902 is in a peeling position. In other embodiments, one or more other sensors may be alternatively or additionally included in printer 1100. For example, one or more sensors may be used to determine the position of a support member, such as support member 904A. As another example, one or more sensors may be included inside of the printer housing (e.g., on the frame of the printer, on a circuit board and/or at any other suitable location).

FIG. 11B shows a block diagram of example circuitry 1068 that may be included in a printer. As shown in FIG. 11B, in accordance with some embodiments, circuitry 1068 includes various means, such as processor 1104, memory 1106, communication interface 1108 and user interface 1110 that can be configured to perform the various functions herein described. These means of circuitry 1068 as described herein may be embodied as, for example, hardware elements, including control circuitry (e.g., processor 1104, including any suitably programmed processor and/or combinational logic circuit, among other things), a computer program product comprising computer-readable program instructions (e.g., software/firmware) stored on a nontransitory computer-readable medium (e.g., memory 1106) that is executable by the printer's other circuitry (e.g., processor 1104), or some combination thereof.

Processor 1104 may, for example, be embodied as various means including one or more microprocessors with accompanying digital signal processor(s), processor(s) without an accompanying digital signal processor, coprocessors, multicore processors, controllers, computers, various other processing elements including integrated circuits such as, for example, an ASIC (application specific integrated circuit) or FPGA (field programmable gate array), or some combination thereof. Accordingly, although shown in FIG. 11B as a single processor, in some embodiments processor 1104 comprises a plurality of processors and/or any other type of control circuitry. The plurality of processors, for example, may be embodied on a single computing device or may be distributed across a plurality of computing devices collectively configured to function as a printer. The plurality of processors may be in operative communication with each other and may be collectively configured to perform one or more functionalities of circuitry 1068 as described herein. In an example embodiment, processor 1104 is configured to execute instructions stored in memory 1106 and/or that are otherwise accessible to processor 1104. These instructions, when executed by processor 1104, may cause the printer to perform one or more of the functionalities as described herein. As such, whether configured by hardware, firmware/software methods, or by a combination thereof, processor 1104 may comprise an entity capable of performing operations according to embodiments of the present invention while configured accordingly. Thus, for example, when processor 1104 is embodied as an ASIC, FPGA or the like, processor 1104 may comprise specifically configured hardware for conducting one or more operations described herein. Alternatively, as another example, when processor 1104 is embodied as an executor of instructions, such as may be stored in memory 1106, the instructions may specifically configure processor 1104 to perform one or more algorithms and operations described herein.

Memory 1106 may comprise, for example, volatile storage, non-volatile storage, or some combination thereof. Although shown in FIG. 11B as a single memory component, memory 1106 may comprise a plurality of memory components. The plurality of memory components may be embodied on a single computing device or distributed across a plurality of computing devices. In various embodiments, memory 1106 may comprise, for example, a hard disk, random access memory, cache memory, flash memory, a compact disc read only memory (CD-ROM), digital versatile disc read only memory (DVD-ROM), circuitry configured to store information, any other type of memory, or some combination thereof. Memory 1106 may be configured to store information, data, applications and instructions, among other things, for enabling circuitry 1068 to provide various functionality in accordance with some example embodiments of the present invention. For example, memory 1106 can be configured to buffer input data for processing by processor 1104. Additionally or alternatively, in at least some embodiments, memory 1106 is configured to store program instructions for execution by processor 1104. Memory 1106 may store information in the form of static and/or dynamic information. This stored information may be stored and/or used by circuitry 1068 during the course of performing its functions.

Communication interface 1108 may be embodied as any device or means embodied in circuitry, hardware, a computer program product comprising computer readable program instructions stored on a computer readable medium (e.g., memory 1106) and executed by a processing device (e.g., processor 1104), or a combination thereof that is configured to receive and/or transmit data from/to another device, such as, for example, a second printer and/or the like. In at least one embodiment, communication interface 1108 is at least partially embodied as or otherwise controlled by processor 1104. In this regard, communication interface 1108 may be in communication with processor 1104, such as via a bus (not shown). Communication interface 1108 may include, for example, an antenna, a transmitter, a receiver, a transceiver, network interface card and/or supporting hardware and/or firmware/software for enabling communications with another computing device. Communications interface 1108 may also include one or more sensors, such as sensor 1102, which can be configured to detect the position of peel bar 902 (e.g., peeling position, ready position and/or non-peeling position), among other things. Communication interface 1108 may also be configured to receive and/or transmit data using any protocol suitable for facilitating communications between computing and/or other types of devices. Exemplary docking stations are provided in commonly-assigned U.S. patent application Ser. No. 13/085,431, titled "MOBILE PRINTER NETWORKING AND INTERFACING," which was incorporated herein in its entirety by reference. Communication interface 1108 may additionally be in communication with the memory 1106, user interface 1110 and/or any other component of the printer, such as via a bus (not shown).

User interface 1110 may be in communication with processor 1104 to receive an indication of a user input and/or to provide an audible, visual, mechanical, or other output to a user. As such, user interface 1110 may include, for example, display 108, left button 110, right button 112, menu button 114, back button 116, navigation buttons 118, feed button 120, power button 122, an audio transducer, and/or other input/output mechanisms.

Circuitry 1068 may also include one or more drive motors 1112, which may be configured to move one or more media units when printing and/or to move peel bar 902 from and/or to one or more positions, among other things. For example, sensor 1102 may be configured to provide an indication of the position of the peel bar. Processor 1104 (and/or any other type of control circuitry) can be configured to receive the peel bar position indication from sensor 1102. In response to an indication representing peel bar 902 being in a non-peeling position, for example, processor 1104 can be configured to retrieve a drive motor parameter and cause electric drive motor 1112 to move print media relative to a printhead at a first speed and/or in accordance one or more other drive motor parameters stored in memory (such as at a predetermined torque). In response to an indication representing peel bar 902 being in a peeling position, for example, processor 1104 can be configured to retrieve a drive motor parameter and cause electric drive motor 1112 to move the print media relative to the printhead at a second speed and/or in accordance one or more other drive motor parameters stored in memory (such as at a greater torque). The first and second speeds and/or drive motor parameters retrieved can be different. For example, the second speed can be slower than the first speed, or vice-versa. As another example, the torque may be increased when the peel bar is in a peeling position. As another example, the optimum position of the media unit with respect to the printhead may be adjusted, either while printing (position of the printed dots relative to the edge of a label) or after printing (position of the printed label relative to the printhead, tear bar, or peel sensor) or both.

Memory 1106 can be configured to store a drive table that includes drive motor parameters and/or other types of instructions executable by the control circuitry. The drive table's instructions can include, for example, parameters associated with the first speed and the second speed associated with, e.g., the position of the peel bar. As a further example, processor 1104 can be further configured to cause electric drive motor 1112 to move the print media relative to the printhead at the second speed in response to determining the printer is experiencing or is likely to experience an overheating error.

In addition to or instead of adjusting the print speed based on the position of the peel bar (and/or any other sensor indication, such as battery power), processor 1104 can be configured to enter a non-peel or peel mode that includes other parameters. For example, while in the peel mode a display (e.g., icon, words, etc.) may be presented indicating that the peel bar is in a peeling position. Similar displays may be presented for other modes (based on, e.g., positions of the peel bar). In some embodiments, for example, the lack of an icon and/or other display may be used to inform the user of the printer's operational mode. For example, the lack of a peel mode indication indicator (e.g., icon) being displayed may indicate to the user that the printer is in non-peel mode.

As such, some embodiments discussed herein can reduce the possibility that the label media may become misaligned, resulting in a wasted label. In some embodiments, there is no need to open a latch or cover. The user can switch to peel mode and back to non-peel mode as often as desired without wasting labels.

FIG. 12 shows an exemplary method, namely process 1200, that may be implemented by and/or with the processor and/or other components of a printer, such as mobile printer 100 and/or printer 200. Like some other processes discussed herein, process 1200 is represented by a flow diagram in accordance with some exemplary methods, computer program products and/or systems discussed herein, including printers 100, 200 and 1100. It will be understood that each operation, action, step and/or other types of functions shown in the diagram, and/or combinations of functions in the diagrams, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein. For example, program code instructions associated with FIG. 12 may be stored on one or more storage devices, such as memory 1106, and executed by one or more processors, such as processor 1104. Additionally or alternatively, one or more of the program code instructions discussed herein may be stored and/or performed by distributed components, such as those discussed in connection with printers 100, 200 and 1100. As will be appreciated, any such program code instructions may be loaded onto computers, processors, other programmable apparatuses (e.g., printer 100, 200 or 1100) from one or more computer-readable storage mediums (e.g., memory 1106) to produce a particular machine, such that the particular machine becomes a means for implementing the functions of the actions discussed in connection with, e.g., FIG. 12 and/or the other drawings discussed herein.

The program code instructions stored on the programmable apparatus may also be stored in a nontransitory computer-readable storage medium that can direct a computer, a processor (such as processor 1104) and/or other programmable apparatus to function in a particular manner to thereby generate a particular article of manufacture. The article of manufacture becomes a means for implementing the functions of the actions discussed in connection with, e.g., FIG. 12 and the other flow chart included herein. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., process 1200 of FIG. 12.

Process 1200 starts at 1202 and at 1204 the printer receives an indication of a user's desire to open the printer's media cover. For example, the user may touch a virtual button presented by a touch-display, an electromechanical button, a remote control button, a mechanical button (such as cover release actuator 124), and/or utilize any other means for indicating a desire to open the printer's media cover.

In response to receiving the peel bar position indication of the user's desire to open the media cover, the printer may, at 1206, unlatch or otherwise open the media cover. At 1208, the printer receives media for printing and/or encoding. For example, the printer may receive paper, a roll of labels on a backing, and/or any other type of media onto which indicia can be printed and/or programmed.

If the media received at 1208 is attached to a liner or other backing, the media may be peeled from the backing by a peeler after printing. If a peeler bar is to be used, 1212 can be next in process 1200.

At 1212, the printer receives an indication of a user's desire to release the printer's peeler bar from its latched position. For example, a user may depress a push button, such as push button 802. The printer can be adapted to release its peeler bar in response to receiving the peel bar position indication of a user's desire to release the peeler bar. In other embodiments, the peeler bar may also or instead be released in response to the printer's circuitry determining that the peeler bar should be released. For example, the media loaded into the printer may include a radio frequency tag, visual indicia (e.g., marks on the backing), any other means, or combination there of that includes data and/or that is otherwise interpreted by the printer to mean the media is to be peeled from a backing after printing. In some embodiments, printer 400 may include a spindle that includes a radio frequency identification ("RFID") reader, some examples of which are discussed in commonly-assigned U.S. Patent Application Publication No. 2008-0298870, titled "MEDIA PROCESSING SYSTEM AND ASSOCIATED SPINDLE," which is hereby incorporated by reference in its entirety.

At 1216, the printer prints/encodes the media with the peeler bar engaged. The printer can also be configured to monitor for error conditions while printing. For example, at 1218 the printer determines whether the media needs to be replenished (e.g., is there enough media for the remaining or expected print job). In response to determining that the media needs replenishing, process 1200 returns to 1204 and the printer can wait to receive an indication of the user's desire to open the media cover. In some embodiments, process 1200 may return to 1206 and the media cover may be opened automatically by the printer. The printer may also or instead display a message on its display screen and/or on a remote display screen that the printer is low or out of media and needs replenishing.

In response to determining at 1218 that the media does not need replenishing, process 1200 can proceed to 1220 and the printer determines whether more indicia needs to be printed/encoded. For example, the printer may have received an initial print command for a print job involving the printing of a number of labels, which has not yet been completed. If more labels are to be printed/encoded, process 1200 returns to 1216 and the printer prints the media with the peeler bar engaged.

At 1222, the printer can be configured to wait for another print command before printing/encoding more indicia. The printer may wait at 1222 if, for example, the previous print job has been completed and/or a sensor is detecting the peeled label affixed to the peeler bar, among other reasons.

While waiting for a print command at 1222 (or at any other time), a user may decide and/or the printer may be configured to decide stop using the peel bar at 1224. In response to a determination to continue to use the peel bar, process 1200 can proceed to 1226.

At 1226, the printer may determine whether it should shut down, enter a sleep mode (due to, e.g., a predetermined time period lapsing, the power button being depressed, etc.), and/or enter a partial sleep mode (shutting down or otherwise reducing the power draw of one or more components). If the printer determines it should not shut down or enter a sleep mode, process 1200 can return to 1220. If the printer determines at 1226 the printer should enter a power down or sleep mode, process 1200 ends at 1228.

Returning to 1210, in response to determining that the print job is to be executed without the peeler bar, process 1200 proceeds to 1230. At 1230, the peeler bar remains latched in the closed position and at 1232 the media is printed by the printer without using the peeler bar. Process 1200 may also proceed to 1232 in response to the peel bar being stowed at 1224.

At 1234. the printer can be configured to determine whether the media needs to be replenished (e.g., is there enough media for the remaining or expected print job). In response to determining that the media needs replenishing, process 1200 returns to 1204 and the printer can wait to receive an indication of the user's desire to open the media cover. In some embodiments, process 1200 may return to 1206 and the media cover may be opened automatically by the printer, unlocked for a user to open, etc. The printer may also or instead display a message on its display screen and/or on a remote display screen that the printer is low or out of media and needs replenishing.

In response to determining at 1234 that the media does not need replenishing, process 1200 proceeds to 1236 and the printer can determine whether more indicia needs to be printed/encoded. For example, the printer may have received an initial print command for a print job involving the printing of a number of labels which has not yet been completed. If more sheets are to be printed/encoded, process 1200 returns to 1232 and the printer prints the media with the peeler bar latched or otherwise disengaged from the printing process.

At 1238, the printer can be configured to wait for another print command before printing/encoding more indicia. The printer may wait at 1238 if, for example, the previous print job has been completed, a sensor is detecting an error condition (such as overheating), among other reasons.

While waiting for a print command at 1238, a user may decide and/or the printer may be configured to decide start using the peel bar at 1240. In response to a determination to use the peel bar, process 1200 can proceed to 1214.

In response to a determination to continue not using the peel bar (e.g., allow the peel bar to remain in the non-peeling position), process 1200 can proceed to 1242.

The printer may then determine at 1242 whether it should shut down or enter a sleep mode (due to, e.g., a predetermined time period lapsing, the power button being depressed, etc.). If the printer determines it should not shut down or enter a sleep mode, process 1200 returns to 1236. If the printer determines at 1242 the printer should enter a power down or sleep mode, process 1200 ends at 1228.

FIG. 13 shows process 1300 that can be implemented using a printer's processor and/or other components in accordance with some embodiments. Process 1300 can enable a printer to determine whether the peeler bar is engaged or disengaged, and dynamically adjust the print speed accordingly.

For example, the printer's circuitry can communicate with at least one peeler sensor that monitors whether the peeler bar is engaged. The peeler sensor(s) can be incorporated on the printer's circuit board, in the media cover, within the printer's housing, and/or elsewhere within the printer. In response to the peeler sensor indicating the peeler is engaged, the printer's control circuitry can be configured to provide relatively more electrical current to the print feed motor. Dynamically adjusting the current of the drive motor may improve print quality (with or without changing the print speed) by providing more torque when a peeler bar, such as peeler 704, is engaged. The additional torque can compensate for the drag applied to the print media by the peeler bar. Similarly, relatively less electrical current can be provided to the drive motor to reduce the torque when the peeler bar is not engaged. By providing less current when the peeler bar is disengaged, the printer's battery life can be extended without sacrificing print quality. The amount of electrical current can be determined based on, for example, a drive motor parameter and/or any other type of instructions received and/or retrieved by the printer's processor. Process 1300 may benefit, among other things, a portable printer that may be relatively limited in available torque and speed by its battery and motor size. While it is sometimes desirable to have the ability to print at the fastest speed possible to satisfy customer requirements, the printer's maximum speed (for marketing and other purposes) can be limited by the available motor torque when peeling.

Drive tables can be generated and stored in the printer's memory and accessed when the peeler bar is and/or is not being used. The drive tables can include, for example, drive motor parameters and/or other types of settings that are optimized for both peel mode and non-peel mode. This optimization can be used to, for example, print at a faster speed when in non-peel mode without negatively impacting the print quality and/or other variables while in peel mode. As another example, the drive tables can include data related to the print registration (such as, e.g., where the print line should begin) and/or other data that may be affected based upon whether a peeler bar is engaged or disengaged. Additionally, the manufacture may be able to advertise the maximum print speed at a higher rate than that used when in peel mode. Adjusting the print speed, torque and/or other drive motor parameter can also solve historical problems related to the printer stalling and overheating when peeling. Optimal settings could also be dependent on the particular type of media because it could be dependent on media thickness, shape, material, temperature, adhesive characteristics, label gap indication (including blackmark or notch), and even perforations or other die-cut attributes.

Process 1300 begins at 1302 and advances to 1304 at which the printer receives a command to print/encode indicia onto media. At 1306 the printer determines whether or not a peeler bar is engaged. For example, the printer can include a peeler sensor that generates one or more signals when the peeler bar is engaged (properly or otherwise) and/or when the peeler bar is disengaged (properly or otherwise). The peeler sensor may be configured to generate the signal(s) in response to making physical contact, electrical contact, and/or magnetic contact with locking protrusions 808 and/or in response to detecting the absence of locking protrusions 808. Information as to whether the peeler is engaged could also be recalled from a memory location where the information was established from some prior process. As another example, regardless of whether a peeler sensor is included and/or functioning properly, the printer may be able to read information (visually, wirelessly, mechanically and/or by any other means) from the media and/or a spindle onto which the media is wound, and determine at 1306 whether or not the peeler bar should be and therefore is engaged.

In response to determining at 1306 the peeler bar is engaged, process 1300 proceeds to 1308 at which the printer can access, for example, a torque setting stored in memory. The torque setting can be used by the printer to optimize print speed for printing/encoding indicia onto media that is being removed from a backing using the printer's peeler bar. The addition of a detection device, such as a switch to detect when a printer is in peel mode combined with software, firmware and/or other hardware optimized to drive the motor according to the switch status, can permit the maximum speed of a printer to be increased when not peeling and slowed down for additional torque when peeling.

At 1310, the printer can utilize other printing settings for printing indicia onto media to be peeled from its backing. For example, an optical sensor (e.g., transmissive sensor, reflective sensor, or combination thereof), a proximity sensor, or other type of label-detecting sensor can be used by the printer to determine whether a printed/encoded label is affixed to the peeler bar and awaiting removal.

At 1312, the printer prints/encodes indicia onto the media in accordance with the one or more printing settings (including, e.g., the torque setting). At 1314, the peeler bar removes the media from its backing as the printer's roller bars (and/or other components) advance the media out of the printer's printing/encoding zones. At 1316 the printer determines whether it should pause printing. Printing may be paused in response to, for example, receiving a pause command from a user and/or another device, a printer sensor detecting an error has occurred, a printer sensor detecting that the media is affixed to the peeler bar and is awaiting removal, and/or for any other reason.

In response to determining at 1316 that printing should not be paused (e.g., no error detected, nothing blocking the path of the media being printed/encoded, etc.), process 1300 returns to 1312 and the printing continues. In response to determining at 1316 that printing should be paused until, for example, the previously printed media is removed from the peeler bar, the printer waits at 1318 for the printed media to be removed from the peeler bar. A determination is made at 1320 whether the printed/encoded media has been removed from the peeler bar. In response to determining at 1320 the printed/encoded media has not been removed from the peeler bar, process 1300 returns to 1318 and continues to wait. In response to determining at 1320 that the media has been removed from the peeler bar, process 1300 returns to 1304.

After determining at 1306 that the peeler bar is disengaged, process 1300 advances to 1322 at which the printer utilizes a torque setting for printing onto backless media that is not to be peeled. At 1324, other print settings can also be used for printing onto backless media and at 1326 the printer can print/encode indicia onto the media in accordance with the printing settings. Process 1300 may then return to 1304.

In summary, the peeler can be activated and placed into the peeling position by the user and/or the printer when peeling is desired, and then retracted out of the way into a non-peeling position when peeling is complete and/or no longer desired. Some embodiments of the peel bar may have various advantages over similar mechanisms, such as those based on the peeler assembly's compact size, the push-button actuation, and the peel bar's semi-automatic, threadless operation (traditional liner or backing threading is replaced with media threading, i.e., simply placing the peel bar on top of a media unit). The peeler's pivoting arm(s) and roller(s) of some embodiments can be adapted to force the backing of a label around a stripper bar, cams and springs in the media access cover can provide the peeling force, and an actuating lever can also be included. To operate the peeler, the user can open the media door and press an internal (or external) lever or other type of button, thereby releasing the peeler into the extended, ready position using springs included in the printer. As the user closes the media door, pins (e.g., locking protrusions 808) on the ends of the peeler can be adapted to engage a spring-loaded cam on each side of the media door, engaging the peeler and pulling the backing tight around the peeler bar. When then user and/or printer is finished peeling labels, the user and/or printer can again open the media door, and push or otherwise return the peel bar back into its stowed, non-peeling position.

Universal Printhead

A printer in accordance with embodiments discussed herein can include a universal printhead, such as that shown in FIGS. 14A-14C. FIG. 14A shows a portion of a printer that includes, among other things, universal printhead 806 and various components of a peeler assembly, such as that discussed in connection with FIGS. 8A-8D. FIGS. 14B and 14C show two opposite faces of printhead 806. In particular, FIG. 14B shows an example printing face 1402 and FIG. 14C shows an example mounting face 1404.

Printhead 806 is shown as being generally rectangular in shape and defined by first distal end 1406, second distal end 1408 (located opposite first distal end 1406), top end 1410 and bottom end 1412 (located opposite top end 1410). (The terms "bottom" and "top" are referenced herein to avoid overcomplicating the discussion. Any connotation or denotation relating to the meaning of "top" and "bottom," such as those relating to their relative position in relation to the direction of gravitational pull, are not to necessarily be read into their meaning herein.) Printing face 1402 is generally defined by first distal end 1406, second distal end 1408, top end 1410 and bottom end 1412. Printing face 1402 can also include one or more printing components, such as thermal element 1414. Thermal element 1414 may be configured to, for example, conduct thermal energy and cause at least a portion of a print media and/or print ribbon to be heated.

FIG. 14B also shows electrical interface 1416, which may be configured to receive and/or otherwise couple with a connector component, such as a serial and/or parallel bus. Electrical interface 1416 may enable printhead 806 to receive inputs (such as printing commands) from, for example, control circuitry (e.g., processor 1104). Although electrical interface 1416 is shown as being positioned proximate to bottom end 1412, electrical interface 1416 may be positioned in any suitable location(s) that enables it to, e.g., be coupled to thermal element 1414.

As shown in FIG. 14C, universal printhead 806 can include one or more mounting components configured to mount printhead 806 to a printer. For example, a first mounting component, such as mounting holes 1420, and/or a second mounting component, such as one or more grooves 1422, can be included on mounting face 1404.

Mounting holes 1420 can be unthreaded or threaded. In some embodiments, there may be one or more of each type of mounting holes. In other embodiments, the mounting holes may be of the same type (e.g., threaded or unthreaded). The size (e.g., diameter and depth) of mounting holes 1420 may be the same, different or a combination thereof (e.g., some the same, some different).

Grooves 1422 are shown as extending substantially parallel to top end 1410 and the bottom end 1412. In some embodiments, one or more grooves can instead or additionally be positioned in any suitable fashion on mounting face 1404.

Additionally or alternatively, universal printhead 806 can also include one or more notches, heat sinks, shielding components, and/or any other mounting component(s). As such, mounting face 1404 of universal printhead 806 can provide a generic mounting platform that has flexible mechanical interface to compliment the flexible electrical interface provided by electrical interface 1416. As such, universal printhead 806 may be configured to be used with different printers (e.g., different manufacturers' printers, types of printers, etc.). Additionally, mounting face 1404 can be configured to facilitate relatively easy replacement of universal printhead 806 over the printer's product life as compared to other printheads. In some embodiments, printhead 806 can be made at least partially from aluminum and/or any other suitable material(s).

CONCLUSION

Various other features for, modifications to and other embodiments of the inventions set forth herein will come to mind to one skilled in the art to which these inventions pertain having the benefit of the teachings presented in the foregoing descriptions and the associated drawings. For example, while examples discussed herein are often related to mobile printers, one skilled in the art would appreciate that other types of printers, such as desktop or less mobile printers, as well as other types of devices may benefit from embodiments discussed herein. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

What is claimed is:

1. A method comprising:

positioning a peeler assembly of a printer in one of a peeling position, in which media is peeled from a backing, and a non-peeling position, in which the backing and the media remain affixed to each other;

detecting a portion of the peeler assembly to determine a current position of the peeler assembly; and adjusting at least one print setting in response to detecting the current position of the peeler assembly.

2. The method of claim 1, wherein detecting the current position is performed by a sensor and adjusting the at least one print setting is performed by a processor.

3. The method of claim 2, wherein the at least one print setting comprises at least one of print speed, printhead temperature, or printhead position.

4. The method of claim 3, wherein the sensor is carried by a media cover of the printer.

5. The method of claim 2, wherein the sensor comprises a proximity sensor.

6. The method of claim 2, wherein the sensor comprises a proximity sensor.

7. The method of claim 1, further comprising:

providing an output to a user corresponding to the current position of the peeler assembly.

8. The method of claim 7, wherein the output includes at least one of the list including an audible notification, a visual notification, or a mechanical notification.

9. The method of claim 1, further comprising:

storing the current position of the peeler assembly in memory.

10. The method of claim 1, further comprising:

presenting the current position of the peeler assembly to a user via a user interface.

11. The method of claim 1, wherein the peeler assembly includes locking protrusion that is configured to selectively mate with a latch of the printer to lock peeler assembly in one of the peeling position of the non-peeling position.

12. The method of claim 11, wherein detecting a portion of the peeler assembly to determine a current position of the peeler assembly comprises:

detecting a presence or absence of the locking protrusions when the peeler assembly is in the peeling position or the non-peeling position.

13. A method comprising:

positioning a peeler assembly of a printer in one of a peeling position, in which media is peeled from a backing, and a non-peeling position, in which the backing and the media remain affixed to each other;

detecting a current position of the peeler assembly; and adjusting at least one print setting in response to detecting the current position of the peeler assembly, wherein detecting the current position is performed by a sensor and adjusting the at least one print setting is performed by a processor, and wherein the at least one print setting comprises at least one of print speed, printhead temperature, or printhead position.

14. The method of claim 13, further comprising:

providing an output to a user corresponding to the current position of the peeler assembly.

15. The method of claim 14, wherein the output includes at least one of the list including an audible notification, a visual notification, or a mechanical notification.

16. The method of claim 15, wherein the sensor is carried by a media cover of the printer.

17. The method of claim 14, wherein the sensor comprises a proximity sensor.

18. The method of claim 13, further comprising:

storing the current position of the peeler assembly in memory.

19. The method of claim 13, further comprising:

presenting the current position of the peeler assembly to a user via a user interface.

20. A method comprising:

positioning a peeler assembly of a printer in one of a peeling position, in which media is peeled from a backing, and a non-peeling position, in which the backing and the media remain affixed to each other;

detecting a current position of the peeler assembly;

adjusting at least one print setting in response to detecting the current position of the peeler assembly; and providing an output to a user corresponding to the current position of the peeler assembly.

* * * * *